United States Patent
Farag et al.

(10) Patent No.: US 11,658,727 B2
(45) Date of Patent: May 23, 2023

(54) DYNAMIC BEAM ADAPTATION IN A MULTI-BEAM SYSTEM

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 17/151,051

(22) Filed: Jan. 15, 2021

(65) Prior Publication Data

US 2021/0226689 A1    Jul. 22, 2021

Related U.S. Application Data

(60) Provisional application No. 62/962,573, filed on Jan. 17, 2020.

(51) Int. Cl.
*H04B 7/08* (2006.01)
*H04W 24/10* (2009.01)
*H04B 7/06* (2006.01)

(52) U.S. Cl.
CPC ........... *H04B 7/088* (2013.01); *H04B 7/0617* (2013.01); *H04W 24/10* (2013.01)

(58) Field of Classification Search
CPC .... H04B 7/088; H04B 7/0617; H04B 7/0695; H04W 24/10
See application file for complete search history.

(56) References Cited

U.S. PATENT DOCUMENTS

2017/0346535 A1    11/2017    Islam et al.
2019/0052341 A1*    2/2019    Furuskog ............ H04W 16/28
(Continued)

FOREIGN PATENT DOCUMENTS

WO    2018085601 A1    5/2018
WO    2019032882 A1    2/2019
WO    2019096405 A1    5/2019

OTHER PUBLICATIONS

"3rd Generation Partnership Project; Technical Specification Group Radio Access Network; NR; Physical channels and modulation (Release 16)", 3GPP TS 38.211 V16.4.0, Dec. 2020, 133 pgs.
(Continued)

*Primary Examiner* — Fred A Casca

(57) ABSTRACT

An apparatus for dynamic beam adaptation includes a transceiver configured to receive configuration information for a set of candidate beams for communication with another device and receive a beam indication for a current beam from the set of candidate beams to be used for communication with the other device. The apparatus further includes a processor configured to measure a beam metric for each beam within the set of candidate beams, determine that the current beam is not suitable for the communication with the other device, based on the measured beam metrics, and determine another beam from the set of candidate beams for communication with the other device, based on the measured beam metrics. The transceiver is further configured to transmit an information on an uplink (UL) channel to the other device using the other beam.

20 Claims, 14 Drawing Sheets

(56) References Cited

U.S. PATENT DOCUMENTS

2019/0199412 A1    6/2019  Koskela et al.
2019/0306875 A1*  10/2019  Zhou .................... H04B 7/0617
2019/0349915 A1   11/2019  Ahn et al.
2020/0245176 A1*   7/2020  Zhou .................... H04B 7/0695

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 V16.4.0, Dec. 2020, 169 pgs.
"3rd Generation Partnership Project; Technical Specification Group Radio Access Network; NR; Medium Access Control (MAC) protocol specification (Release 16)", 3GPP TS 38.321 V16.3.0, Dec. 2020, 156 pgs.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.
International Search Report of the International Searching Authority dated Apr. 16, 2021 in connection with International Application No. PCT/KR2021/000679, 4 pages.
Extended European Search Report dated Dec. 5, 2022 regarding Application No. 21741094.3, 10 pages.

* cited by examiner

DYNAMIC BEAM ADAPTATION IN A MULTI-BEAM SYSTEM

CROSS-REFERENCE TO RELATED APPLICATION(S) AND CLAIM OF PRIORITY

This application claims priority under 35 U.S.C. § 119(e) to U.S. Provisional patent Application No. 62/962,573 filed on Jan. 17, 2020, which is hereby incorporated by reference in its entirety.

TECHNICAL FIELD

This disclosure relates generally to beam indication in wireless communications systems. Embodiments of this disclosure relate to methods and apparatuses for indicating a beam for use by a communication device to communicate with a base station in a beamforming-capable wireless communications system.

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices such as tablets, "note pad" computers, net books, eBook readers, and machine type of devices. In order to meet the high growth in mobile data traffic demand and support new applications and deployments, improvements in radio interface efficiency and coverage is of paramount importance.

SUMMARY

Embodiments of the present disclosure provide a method and an apparatus for.

In one embodiment, a user equipment (UE) is provided, comprising a transceiver configured to receive configuration information for a set of candidate beams for communication with another device and receive a beam indication for a current beam from the set of candidate beams to be used for communication with the other device. The UE further comprises a processor configured to measure a beam metric for each beam within the set of candidate beams, determine that the current beam is not suitable for the communication with the other device, based on the measured beam metrics, and determine another beam from the set of candidate beams for communication with the other device, based on the measured beam metrics. The transceiver is further configured to transmit an information on an uplink (UL) channel to the other device using the other beam.

In another embodiment, a base station (BS) is provided, comprising a transceiver configured to transmit configuration information for a set of candidate beams for communication with another device, transmit a beam indication for a current beam from the set of candidate beams to be used for communication with the other device, and receive an information on an uplink (UL) channel from the other device using another beam from the set of candidate beams. The current beam is determined, based on beam metrics measured for each beam within the set of candidate beams, not to be suitable for the communication with the other device, and the other beam is determined based on the beam metrics.

In another embodiment, a method of a UE is provided, including the steps of receiving configuration information for a set of candidate beams for communication with another device, receiving a beam indication for a current beam from the set of candidate beams to be used for communication with the other device, measuring a beam metric for each beam within the set of candidate beams, determining that the current beam is not suitable for the communication with the other device, based on the measured beam metrics, determining another beam from the set of candidate beams for communication with the other device, based on the measured beam metrics, and transmitting an information on an uplink (UL) channel to the other device using the other beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] 3GPP TS 38.211 v16.4.0, "NR; Physical channels and modulation."

[2] 3GPP TS 38.212 v16.4.0, "NR; Multiplexing and Channel coding."

[3] 3GPP TS 38.213 v16.4.0, "NR; Physical Layer Procedures for Control."

[4] 3GPP TS 38.214 v16.4.0, "NR; Physical Layer Procedures for Data."

[5] 3GPP TS 38.321 v16.3.0, "NR; Medium Access Control (MAC) protocol specification."

[6] 3GPP TS 38.331 v16.3.1, "NR; Radio Resource Control (RRC) Protocol Specification."

Abbreviations

ACK Acknowledgement
BLER Block Error Rate
BW Bandwidth
BWP Bandwidth Part
CORESET Control Resource Set
C-RNTI Cell RNTI
CSI Channel State Information
CSI-RS Channel State Information Reference Signal
DCI Downlink Control Information
DL Downlink
DMRS Demodulation Reference Signal
gNB Base Station
HARQ Hybrid ARQ
MCS Modulation and Coding Scheme
NR New Radio
PBCH Primary Broadcast Channel
PCell Primary Cell
PDCCH Physical Downlink Control Channel
PDSCH Physical Downlink Shared Channel
PUCCH Physical Uplink Control Channel
PUSCH Physical Uplink Shared Channel
RB Resource Block
RNTI Radio Network Temporary Identifier
RS Reference Signal
RSRP Reference Signals Received Power
SCell Secondary Cell
SINR Signal to Interference and Noise Ratio
SRS Sounding Reference Signal
SS Synchronization Signals
TB Transport Block
TDD Time Division Duplexing
TPC Transmit Power Control
UCI Uplink Control Information
UE User Equipment
UL Uplink In this disclosure, the term "activation" describes an operation wherein a UE receives and decodes a signal from a network or gNodeB (gNB) that signifies a starting point in time. The starting point can be a present or a future time slot, subframe, or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network or gNB that signifies a stopping point in time. The stopping point can be a present or a future slot, subframe, or symbol—the exact location either implicitly or explicitly indicated, or otherwise fixed or higher-layer configured. Upon successfully decoding the signal, the UE responds accordingly.

In this disclosure, terminology such as transmission configuration indicator (TCI), TCI states, TCI state identifier (ID), SpatialRelationInfo, target RS, reference RS, and other terms are used for illustrative purposes and therefore are not normative. Other terms that refer to the same functions can also be used.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
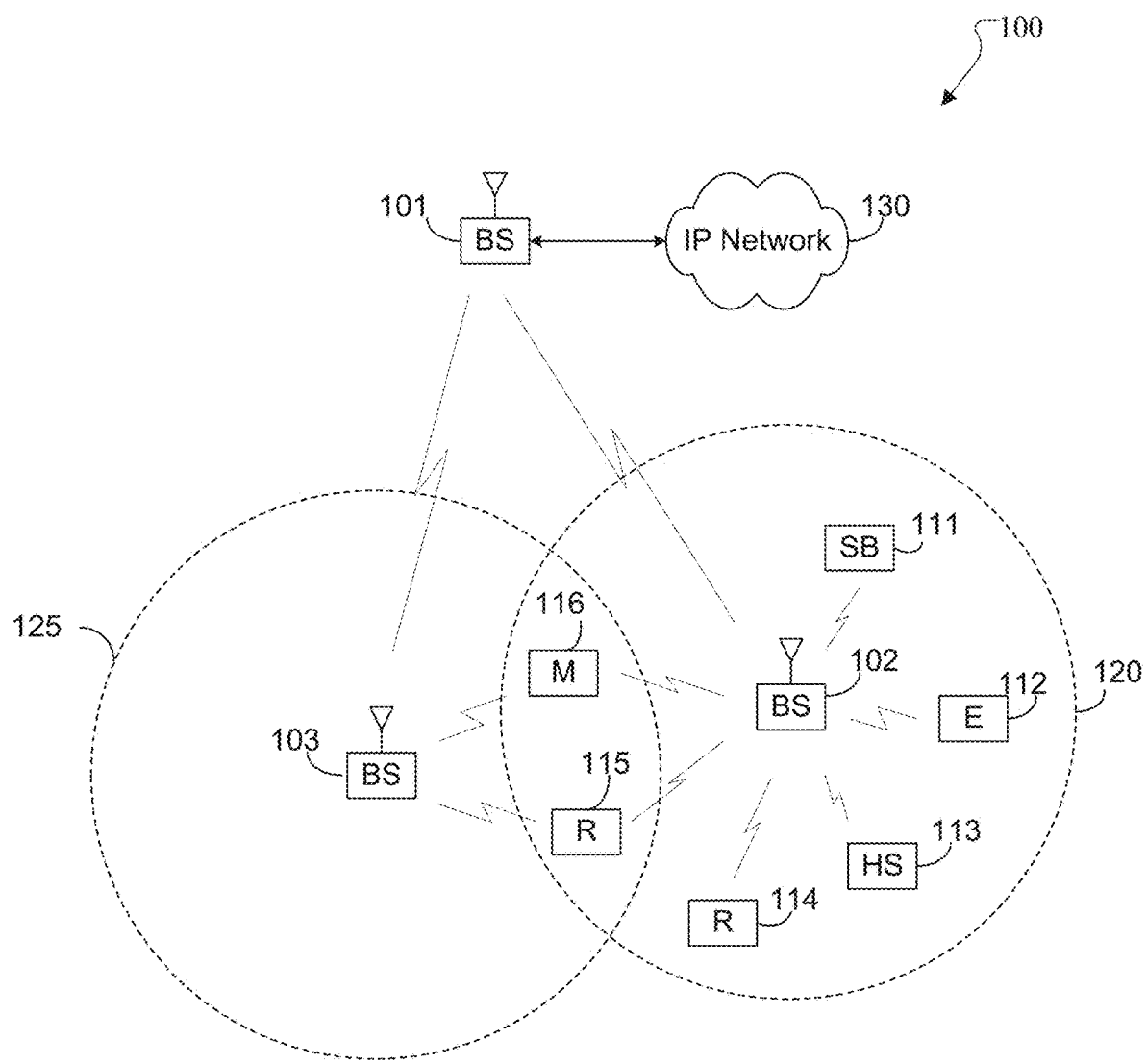
FIG. 1 illustrates an example wireless network, which transmits signals according to the principles of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that in a mobile wireless system, as a UE moves around or rotates, beam management procedures can enable a network (NW), base station (e.g., a gNB), or UE to measure, report, indicate and utilize new suitable beams to communicate on. One aspect of beam management is "beam indication," where a gNB conveys, to a UE, any suitable parameter or field that allows the gNB to indicate to the UE an assigned beam for the UE. One suitable parameter or field for beam indication is a transmission configuration indicator (TCI), such as a DL-TCI, UL-TCI, joint-TCI (which couples DL and UL beam indications either partially or fully). Another suitable parameter or field is an SRS resource indicator (SRI). Another aspect of beam management is "beam reporting," where a UE conveys, to a gNB, a beam report that can include a beam ID and a beam (or link) quality measurement, where the beam quality measurement can be based on L1-SINR, L1-RSRP, estimated BLER, or any other quality metric. The beam report is conveyed in an uplink channel such as the uplink physical control channel (PUCCH) and the uplink physical shared channel (PUSCH).

As discussed herein, a "multi-path environment" refers to a multi-beam operation environment in which a device pair (such as a UE and a gNB) is able to simultaneously use multiple beams having different spatial filters (including non-overlapping spatial filters) to transmit and receive channels (e.g., due to reflection of the beams off of objects in the environment). Additionally, the different paths by which these multiple beams link the device pair can be referred to as "multi-paths." Embodiments of the present disclosure recognize that in a multi-path environment, beams can suddenly appear and disappear due blockage caused by motion of a UE and objects in the surrounding environment. Additionally, the gNB or UE may consider the maximum permissible exposure (MPE) to radiation of the user of the UE, and can determine a path blockage when the user's body is within a path between the UE and the gNB in order to avoid radiation exposure to the user, even in cases where transmissions between the UE and the gNB could still be reliably received.

When a downlink beam that has been used for communication between a gNB and a UE disappears, the network would not be able to indicate a new beam selection to a UE. This could lead to beam failure and potentially radio link failure (RLF). Similarly, when an uplink beam that has been used for communication between a gNB and a UE disappears, the UE would not be able to convey uplink messages including beam measurement reports to the gNB. However, there could be other candidate beams available between a gNB and a UE, where a gNB selects a strongest or most suitable beam for communication with UE.

Embodiments of the present disclosure provide enhancements to beam indication from a gNB to a UE as well as enhancements to beam reporting from a UE to a gNB to allow for better beam adaptation in a dynamic multi-path environment. For simplicity, embodiments of this disclosure related to DL communications are referring to communications from a gNB to a UE that is served by the gNB, and embodiments of this disclosure related to UL communications are referring to communications from the UE to the gNB. It is understood, however, that embodiments of this disclosure could be used with any suitable devices, and embodiments of this disclosure related to DL and UL could refer to communications from any suitable device to any other suitable device.

For the purposes of this disclosure, a beam used for transmission or reception of DL or UL channels prior to beam indication is called an "old beam" or "current beam". A beam used for transmission or reception upcoming DL or UL channels after a beam indication is called a "new beam". The gNB indicates (or conveys) a new beam to a UE using DL-related DCI (that carries a DL grant, such as DCI format 1_1 in NR), UL-related DCI (that carries a UL grant, such as DCI format 0_1 in NR), a purpose-designed DL channel for beam indication that can be UE-specific or for a group of UEs, or a MAC control element (CE). The channel conveying that beam indication is referred to as a "TCI channel", but this doesn't limit a channel to just conveying a TCI, as it can also, or instead, convey the SRI and other fields. A beam used by the channel that conveys the beam indication is called a "TCI channel beam" or a channel for conveying TCI state. A "TCI state" refers to information that characterizes a beam (e.g., information that characterizes the width and direction of a beam, or that defines a spatial filter corresponding to the beam). Because a TCI state characterizes a given beam in a system, "TCI state" may also be used to refer to the beam itself, or to an identifier of the beam from among a list of pre-configured TCI states (e.g., a list of beam hypotheses) associated with a device. Additionally, a TCI can indicate a TCI state, and accordingly the TCI can also be referred to as a TCI state identifier (ID). That is, a TCI refers to a TCI state, and in the context of beam indication refers to a TCI state ID.

A TCI channel is transmitted after a gNB has determined that channel conditions warrant using a new beam. As transmission of the beam indication is a result of a change in channel conditions, using a beam indication mechanism/channel with a suitably designed beam (e.g., a suitably designed TCI channel beam) ensures that the beam indication for a new beam is successfully received by the UE. More specifically, using an "old beam" for a TCI channel beam might not guarantee that the TCI channel is received by a UE, as the UE could be outside the coverage of the old beam. Using a "new beam" for a TCI channel beam also might not guarantee that the TCI channel is received by a UE, as the UE is not aware of the new beam prior to the reception of the TCI channel. Accordingly, embodiments of this disclosure address aspects of a TCI channel beam that enhance the reception of the TCI channel.

Similarly, using a beam report from a UE to a gNB that is light weight (i.e., with a small payload) with a suitably designed beam mechanism that quickly adapts to changing multi-path environment is essential to ensure that a new beam report indicating a change in the multi-path environment is successfully received by the gNB.

Embodiments of the present disclosure also recognize that a TCI channel can convey beam indications for a single UE (referred to as a UE-specific TCI channel or beam indication channel) or for a group of UEs (referred to as a UE-group TCI channel or beam indication channel).

Embodiments of the present disclosure additionally recognize that to facilitate fast beam management it is desirable to streamline the foundational components for beam management. One key functionality of beam management is beam selection, which comprises foundational components such as beam measurement (including training), reporting (for DL beam management, reporting via UL control channel(s)), and indication (for DL and UL beam management, indication via DL control channel(s)). Once the foundational components are streamlined, additional features to facilitate faster beam management can be added. In some embodiments, a "slim mode" with streamlined designs of such foundational components can be used for fast beam management. The slim mode design, due to its compact nature, can facilitate faster updating or reconfiguration via lower-layer control signaling. That is, layer 1 (L1) control signaling is the primary signaling mechanism and higher-layer signaling (such as MAC control element (CE) or RRC) is used only when necessary. Here, L1 control signaling includes the use of UE-group DCI as well as dedicated (UE-specific) DCI.

FIG. 1 illustrates an example wireless network 100, which transmits signals according to the principles of the present disclosure. In the illustrated embodiment, wireless network 100 includes a next generation NodeB (gNodeB or gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" (BS) or "access point" (AP). For the sake of convenience, the terms "gNodeB" and "gNB" are used in this disclosure to refer to network infrastructure components that provide wireless access to remote terminals. Also, depending on the network type, other well-known terms may be used instead of "user equipment" (UE), such as "mobile station," "subscriber station," "remote terminal," "wireless terminal," or "user device." For the sake of convenience, the terms "user equipment" and "UE" are used in this disclosure to refer to remote wireless equipment that wirelessly accesses a gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, 4G long-term evolution (LTE), 4G LTE Advanced (LTE-A), Worldwide Interoperability for Microwave Access (WiMAX), or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include 2D antenna arrays in accordance with embodiments of the present disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 101-103 can communicate directly with the network 130 and provide UEs with direct wireless broadband access to the network 130. Furthermore, the gNBs 101-103 can provide access to other or additional external networks, such as external telephone networks or other types of data networks.

Figure 2:
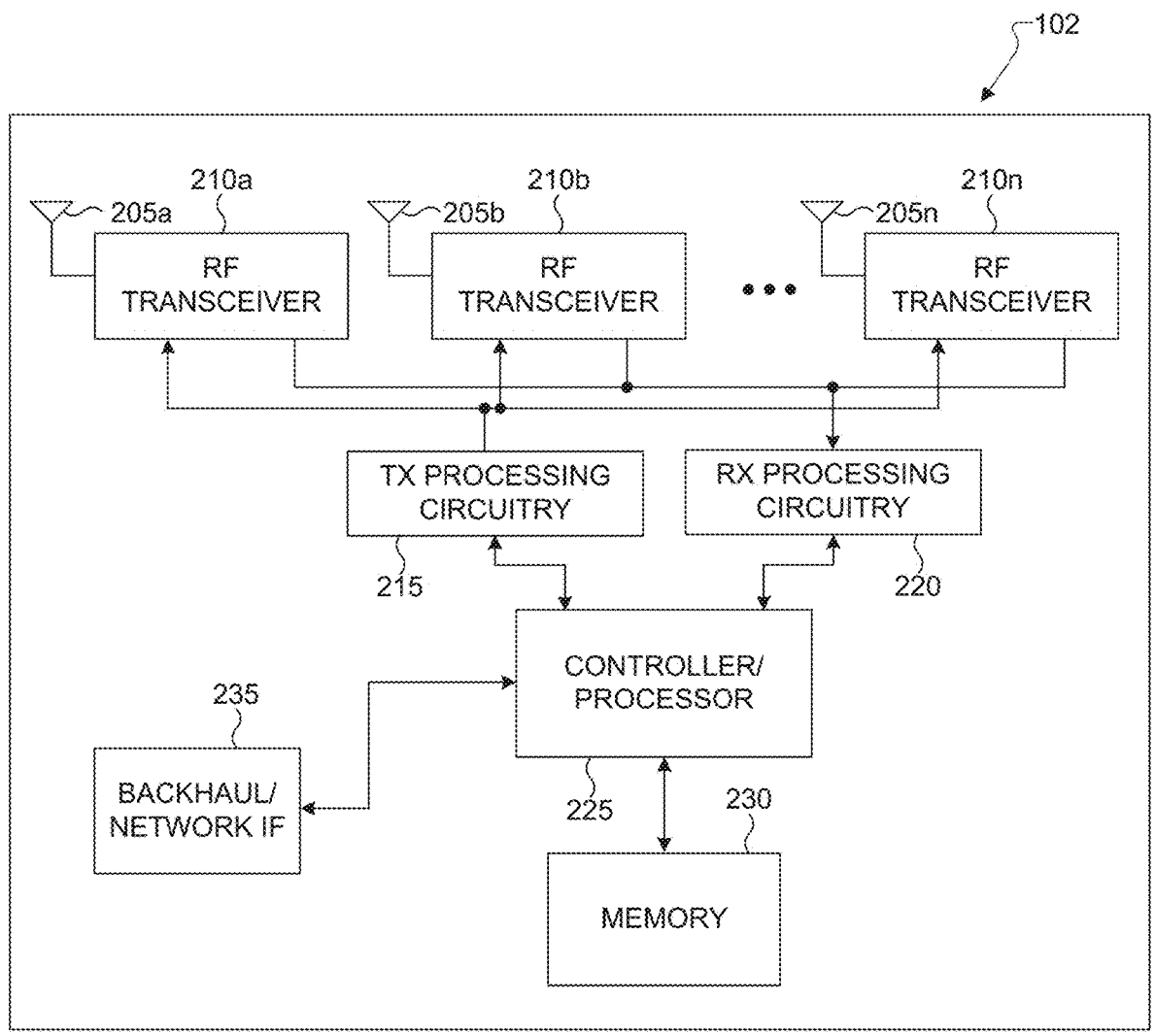
FIG. 2 illustrates an example gNodeB (gNB) according to embodiments of the present disclosure.

FIG. 2 illustrates an example gNB 102 according to embodiments of the present disclosure. The embodiment of the gNB 102 illustrated in FIG. 2 is for illustration only, and the gNB 102 of FIG. 1 could have the same or similar configuration. However, gNBs come in a wide variety of configurations, and FIG. 2 does not limit the scope of this disclosure to any particular implementation of a gNB. It is noted that gNB 101 and gNB 103 can include the same or similar structure as gNB 102.

As shown in FIG. 2, the gNB 102 includes multiple antennas 205a-205n, multiple RF transceivers 210a-210n, transmit (TX) processing circuitry 215, and receive (RX) processing circuitry 220. In some embodiments, one or more of the multiple antennas 205a-205n include 2D antenna arrays. The gNB 102 also includes a controller/processor 225, a memory 230, and a backhaul or network interface 235.

The RF transceivers 210a-210n receive, from the antennas 205a-205n, incoming RF signals, such as signals transmitted by UE 116 or other UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-convert the baseband or IF signals to outgoing RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an operating system (OS). The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a random access memory (RAM), and another part of the memory 230 could include a Flash memory or other read-only memory (ROM).

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
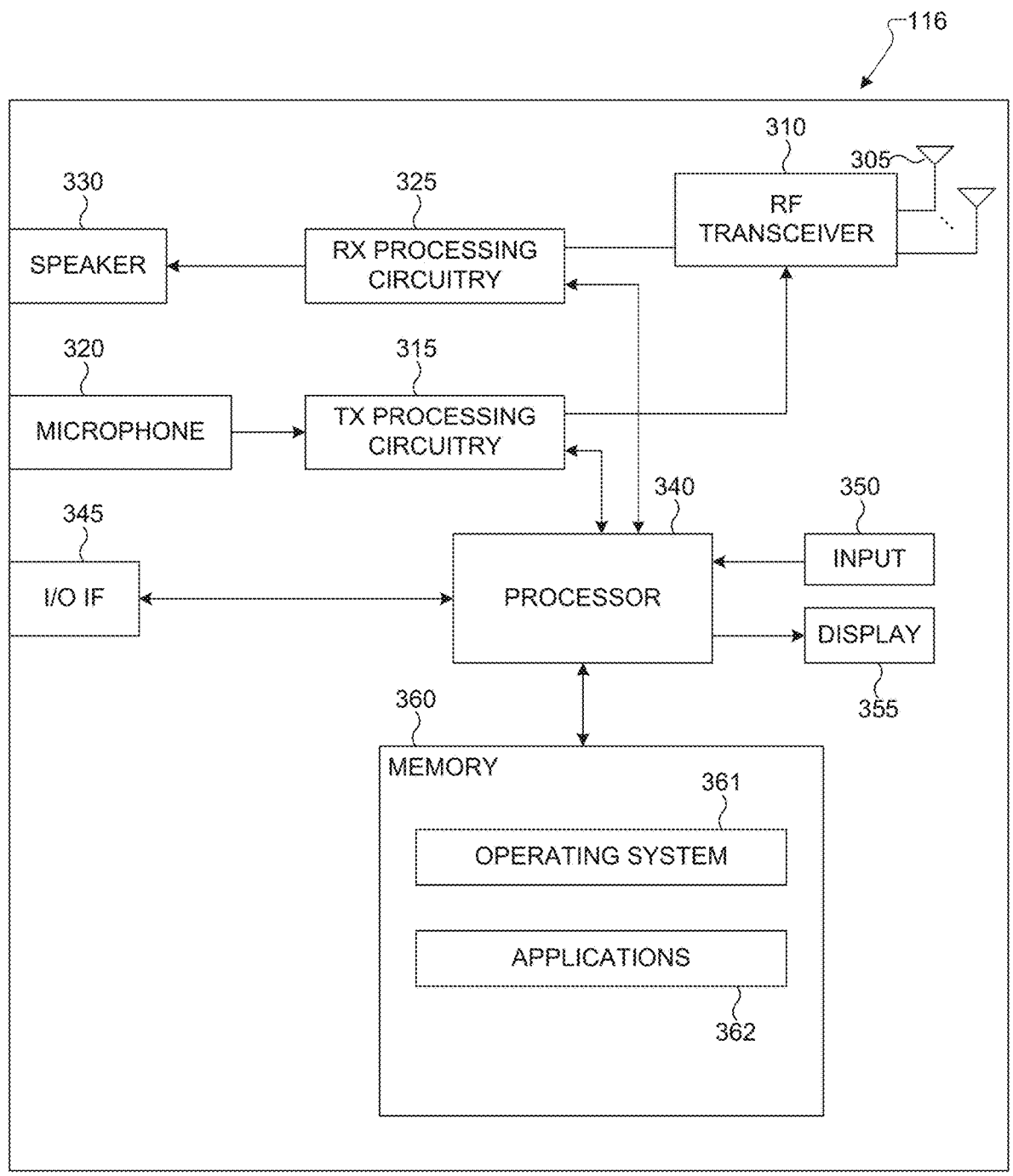
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UE 116 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. In some embodiments, the antenna 305 is a 2D antenna array. The UE 116 also includes a speaker 330, a processor 340, an input/output interface (I/O IF) 345, a touchscreen 350, a display 355, and a memory 360. The memory 360 includes an OS 361 and one or more applications 362.

The RF transceiver 310 receives, from the antenna 305, an incoming RF signal transmitted by a gNB, such as gNB 102, of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an outgoing RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

Figure 4:
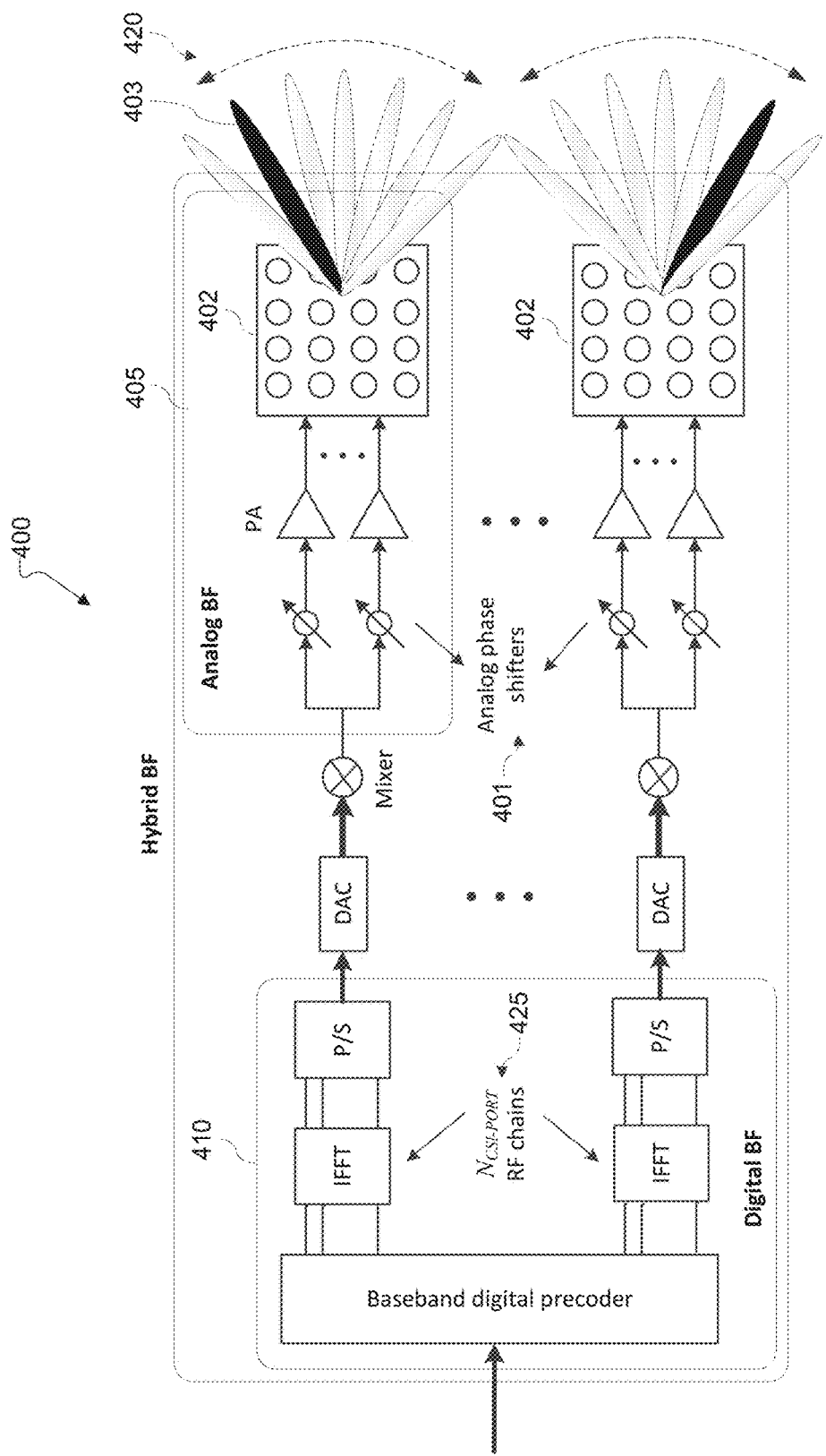
FIG. 4 illustrates a block diagram of example hybrid beamforming (BF) hardware according to embodiments of the present disclosure.

FIG. 4 illustrates a block diagram of example hybrid beamforming (BF) hardware 400 according to embodiments of the present disclosure. For the purposes of this disclosure, the hybrid BF hardware 400 is implemented in the gNB 102 of FIGS. 1 and 2, however it is understood that any other beamforming-capable wireless communication device of wireless network 100, such as the UE 116, could include hybrid BF hardware 400.

3GPP Release 14 LTE and 3GPP Release 15 NR support up to 32 CSI-RS antenna ports, which enables a wireless communication device to be equipped with a large number of antenna elements (e.g., 64 or 128 antenna elements). In such cases, a plurality of antenna elements is mapped onto one CSI-RS port.

By contrast, for mmWave band devices, although the number of antenna elements can be large for a given form factor, the number of CSI-RS ports—which can correspond to the number of digitally precoded ports—tends to be limited due to hardware constraints (such as the feasibility of installing a large number of ADCs or DACs at mmWave frequencies) as illustrated in FIG. 4.

In such an embodiment, one CSI-RS port is mapped onto a large number of antenna elements which can be controlled by a bank of analog phase shifters 401. One CSI-RS port can then correspond to one antenna sub-array 402 which produces a narrow analog beam 403 through analog beamforming 405. This analog beam can be configured to sweep across a wide range of angles 420 by varying the bank of analog phase shifters 401 across symbols or subframes. The number of antenna sub-arrays (equal to the number of RF chains 425) is the same as the number of CSI-RS ports $N_{CSI\text{-}PORT}$.

A digital beamforming unit 410 performs a linear combination across $N_{CSI}$-PORT analog beams to further increase precoding gain. While analog beams are wideband (hence not frequency-selective), digital precoding can be varied across frequency sub-bands or resource blocks. Receiver operation can be designed analogously.

Although FIG. 4 illustrates one example of hybrid BF hardware 400, various changes may be made to FIG. 4. For example, various components in FIG. 4 could be combined, further subdivided, or omitted and additional components could be added according to particular needs.

Since the system of FIG. 4 utilizes multiple analog beams for transmission and reception (wherein one or a small number of analog beams are selected out of a large number, for instance, after a training duration—to be performed from time to time), the term "multi-beam operation" is used to refer to the overall system operation.

The system of FIG. 4 is also applicable to higher frequency bands such as >52.6 GHz (also termed the FR4). In such embodiments, the system can employ only analog beams. Due to the oxygen absorption loss around 60 GHz frequency (approximately 10 dB additional loss at 100 m distance), a larger number of, and sharper, analog beams (hence a larger number of radiators in the antenna array) will be needed to compensate for the additional path loss.

Figure 5A:
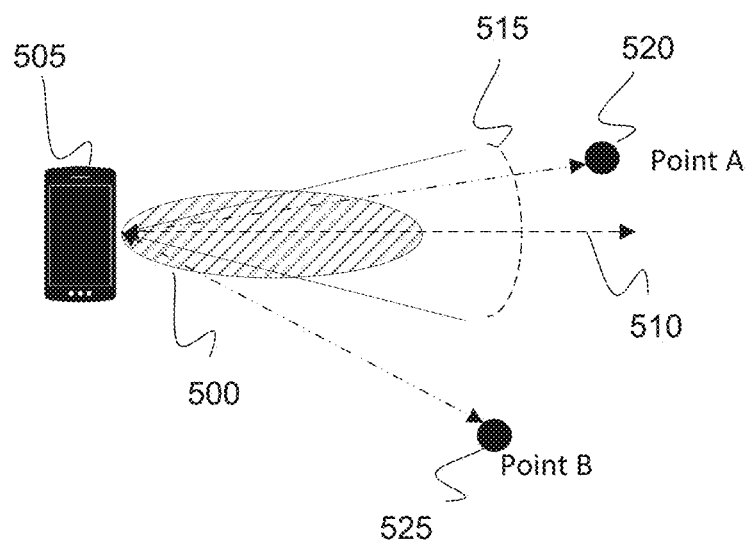
FIGS. 5A and 5B illustrate diagrams of beam operations according to embodiments of the present disclosure.
Figure 5B:
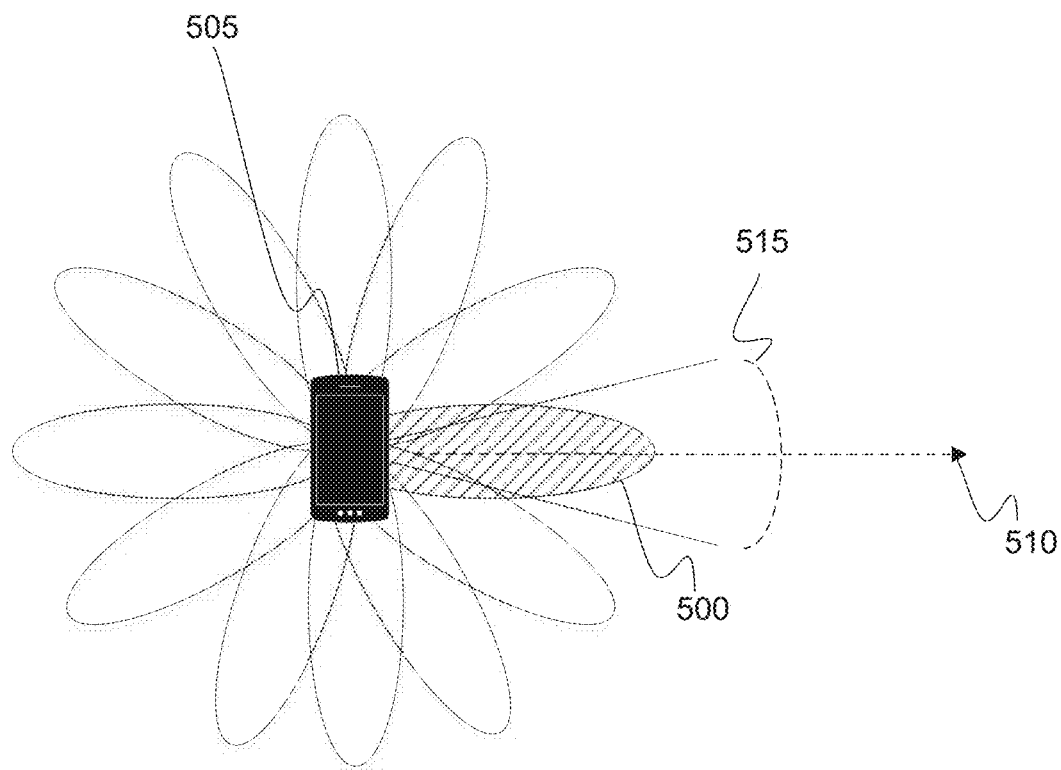

FIGS. 5A and 5B illustrate diagrams of beam operations according to embodiments of the present disclosure. For the purposes of this disclosure, the diagrams of FIGS. 5A and 5B represent operation of wireless communication devices, such as gNB 102 and UE 116, in a wireless network 100. It is understood that the illustrated beam operations could apply to any similar wireless communication devices in any suitable wireless communication system.

As illustrated in FIG. 5A, in a wireless system a beam 500 for a wireless communication device 505 (e.g., a gNB 102 or a UE 116) can be characterized by a beam direction 510 and a beam width 515. For example, a device 505 with a transmitter transmits radio frequency (RF) energy in beam direction 510 and within a beam width 515. A device 505 with a receiver receives RF energy coming towards the device 505 in beam direction 510 and within beam width 515.

A device located at point A (520) can receive from and transmit to device 505 as Point A is within beam width 515 of a beam 500 traveling in beam direction 510 and transmitted from device 505. However, a device at point B (525) cannot receive from and transmit to device 505 as Point B is outside of the beam width 515 of the beam 500 traveling in beam direction 510 and transmitted from device 505. While FIG. 5A, for illustrative purposes, shows a beam 500 in 2 dimensions (2D), it should be apparent to those skilled in the art that a beam can be defined in 3 dimensions (3D), where the beam direction 510 and beam width 515 are defined in 3D space.

In a wireless system, a device such as device 505 can transmit or receive on multiple beams. This is known as "multi-beam operation" and is illustrated in FIG. 5B. While FIG. 5B, for illustrative purposes, is in 2D, it should be apparent to those skilled in the art that a beam can be 3D, where a beam can be transmitted to or received from any direction in 3D space.

Multi-beam operation includes, for the purpose of illustration, indicating an assigned DL or UL transmit (TX) beam (i.e., beam indication), measuring at least one reference signal for calculating and performing beam reporting (also termed "beam measurement" and "beam reporting", respectively), and receiving a DL or UL transmission via selection of a corresponding receive (RX) beam.

In 3GPP Release 15 NR, multi-beam operation is designed primarily for single transmit-receive point (TRP) and single antenna panel systems. Therefore, Release 15 NR supports beam indication for one TX beam, wherein a TX beam is associated with a reference RS. For DL beam indication and measurement, the reference RS can be a non-zero power (NZP) CSI-RS or an SSB (synchronization signal block, which includes primary synchronization signal, secondary synchronization signal, and PBCH). In such an embodiment, DL beam indication is done via a TCI field in DL-related DCI which includes an index to one (and only one) assigned reference RS. A set of beam hypotheses, or "TCI states," is configured via higher-layer signaling (e.g., RRC signaling) and, when applicable, a subset of those TCI states is selected (or activated) via a MAC control element (MAC CE) based on the TCI field code points. For UL beam indication and measurement in such an embodiment, the reference RS can be an NZP CSI-RS, SSB, or SRS. UL beam indication is done via the SRI field in UL-related DCI which is linked to one (and only one) reference RS. This linkage is configured via higher-layer signaling (e.g., RRC signaling) using the SpatialRelationInfo RRC parameter. Essentially, only one TX beam is indicated to the UE.

A "reference RS" corresponds to a set of characteristics of a DL or UL TX beam, such as direction, precoding/beamforming, number of ports, etc. For instance, for DL, as the UE receives a reference RS index/ID in a DL assignment represented by a TCI state, the UE applies the known characteristics of the reference RS to the assigned DL transmission. The reference RS can be received and measured by the UE (in this case, the reference RS is a downlink signal such as an NZP CSI-RS or SSB) with the result of the measurement used for calculating a beam report (in Release 15 NR, at least one L1-RSRP accompanied by at least one CRI). As the gNB receives the beam report, the NW can be better equipped with information to assign a particular DL TX beam to the UE. Optionally, the reference RS can be transmitted by the UE (in this case, the reference RS is an uplink signal such as an SRS). As the gNB receives the reference RS, the gNB can measure and calculate the needed information to assign a particular DL TX beam to the UE. This option is applicable when DL-UL beam pair correspondence holds.

In another instance, for UL, as the UE receives a reference RS index/ID in a UL grant, the UE applies the known characteristics of the reference RS to the granted UL transmission. The reference RS can be received and measured by the UE (in this case, the reference RS is a downlink signal such as an NZP CSI-RS or SSB) with the result of the measurement used for calculating a beam report. As the gNB receives the beam report, the NW can be better equipped with information to assign a particular UL TX beam to the UE. This option is applicable when DL-UL beam pair correspondence holds. Optionally, the reference RS can be transmitted by the UE (in this case, the reference RS is an uplink signal such as an SRS or DMRS). As the gNB receives the reference RS, the gNB can measure and calculate the needed information to assign a particular UL TX beam to the UE.

The reference RS can be dynamically triggered by the gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

For mmWave (or FR2) or higher frequency bands (such as >52.6 GHz, or FR4) where multi-beam operation is especially relevant, the transmission-reception process includes the receiver selecting a receive (RX) beam for a given TX beam. FIGS. 6A-6D below illustrate examples of this selection process for DL multi-beam operations and UL multi-beam operations. The example operations of FIGS. 6A-6D illustrate beam selection for communication between a gNB and a UE using the selected beams, and are discussed from the point of view of a gNB 102 and UE 116 for simplicity, but it is understood that any suitable devices could be used. It is also understood that a device such as a gNB can perform the operations of FIGS. 6A-6D for a plurality of devices such as UEs such that each of the plurality of UEs communicate with the gNB using different beams.

In general, for DL multi-beam operation, the UE selects a DL RX beam for every DL TX beam (which corresponds to a reference RS) that the UE expects to receive from the gNB. When a DL RS (such as CSI-RS or SSB) is used as the reference RS, the gNB transmits the DL RS to the UE (which is associated with a selection of a DL TX beam). In response, the UE measures the DL RS (and in the process selects a DL RX beam) and reports the beam metric associated with the quality of the DL RS. In this case, the UE determines the TX-RX beam pair for every configured (DL) reference RS. Therefore, although this knowledge is unavailable to the gNB, the UE—upon receiving a DL RS (and hence a DL TX beam) indication from the gNB—can select the DL RX beam from the knowledge of all the TX-RX beam pairs.

When a UL RS (such as SRS or DMRS) is used as the reference RS (pertinent when DL-UL beam correspondence or reciprocity holds), the gNB triggers or configures the UE to transmit the UL RS (for DL, and by reciprocity this corresponds to a DL RX beam). The gNB, upon receiving and measuring the UL RS, selects a DL TX beam. As a result, a TX-RX beam pair is derived. The gNB can perform this operation for all the configured UL RSs (either per reference RS or by "beam sweeping") and determine all the TX-RX beam pairs associated with all the UL RSs configured to the UE.

Figure 6A:
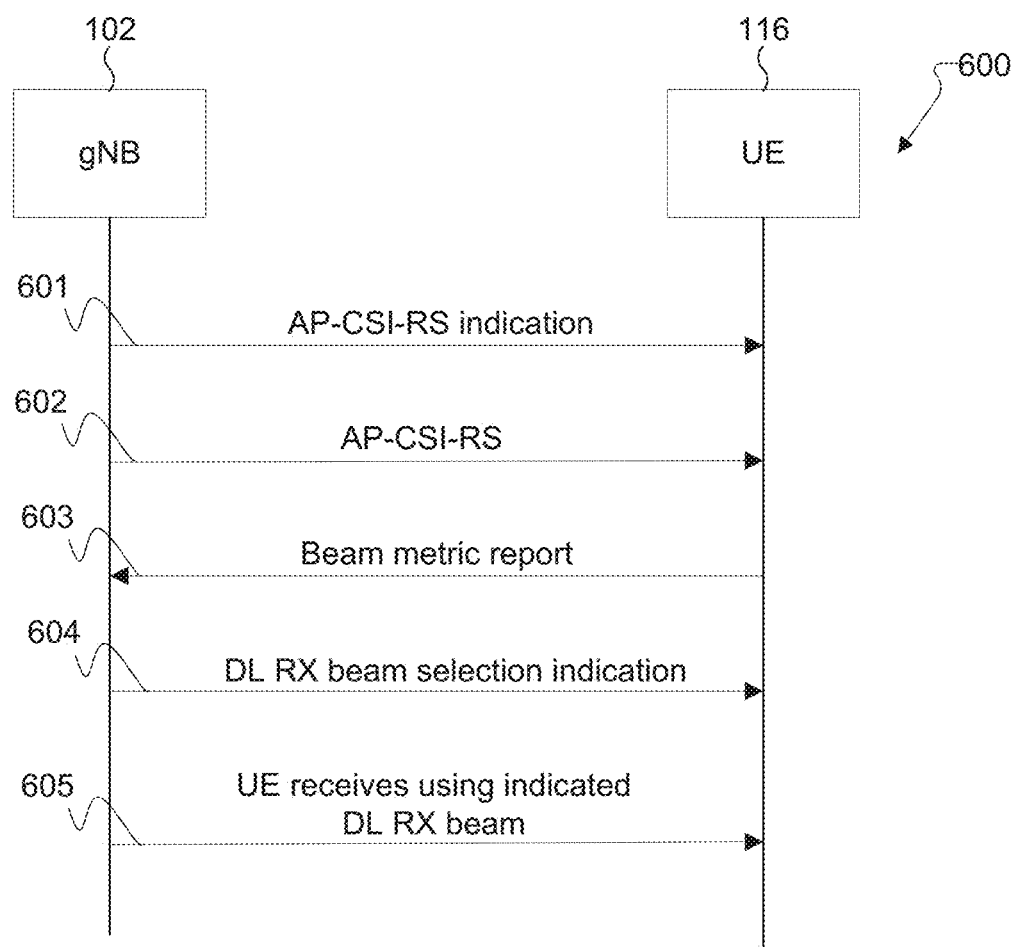
FIGS. 6A and 6B illustrate examples of DL multi-beam operations according to embodiments of the present disclosure.
Figure 6B:
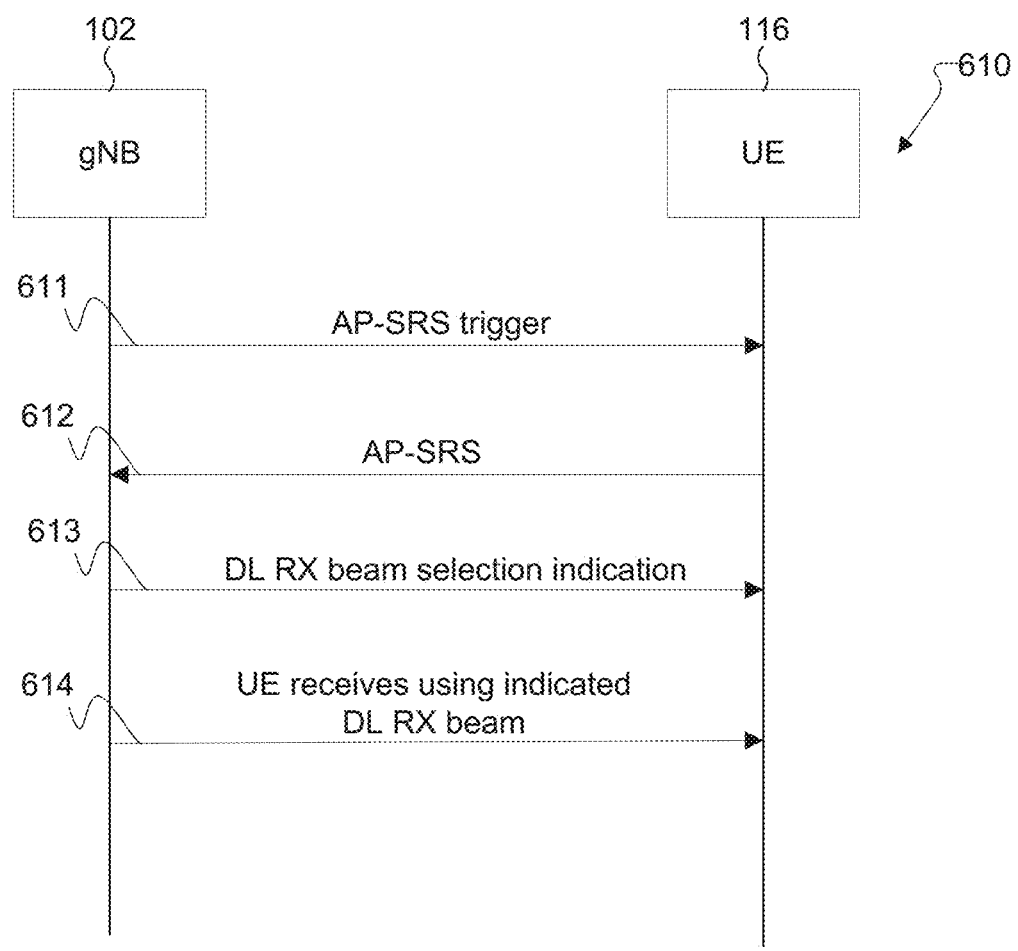

FIGS. 6A and 6B illustrate examples of DL multi-beam operations according to embodiments of the present disclosure. The examples of FIGS. 6A and 6B utilize DL-TCI-based DL beam indication. In the embodiment of FIG. 6A, aperiodic CSI-RS is transmitted by the gNB and measured by the UE. This embodiment can be used whether UL-DL beam correspondence holds or not (where "UL-DL beam correspondence" refers to the condition when between the UL and DL beam-pair-link (BPL) holds). In the embodiment of FIG. 6B, aperiodic SRS is triggered by the gNB and transmitted by the UE so that the gNB can measure the UL channel quality for the purpose of assigning a DL RX beam. This embodiment can be used when UL-DL beam correspondence holds. Although aperiodic RS is used in these two examples, periodic or semi-persistent RS can also be used.

With respect to FIG. 6A, a DL multi-beam operation 600 starts with the gNB signaling to a UE an aperiodic CSI-RS (AP-CSI-RS) trigger or indication (step 601). This trigger or indication can be included in a DCI (either UL-related or DL-related, either separately or jointly signaled with an aperiodic CSI request/trigger) and indicate transmission of AP-CSI-RS in a same (zero time offset) or later (>0 time offset) slot or sub-frame. Upon receiving the AP-CSI-RS transmitted by the gNB (step 602), the UE measures the AP-CSI-RS and, in turn, calculates and reports a "beam metric" (indicating quality of a particular TX beam hypothesis) (step 603). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB can use the beam report to select a DL RX beam for the UE and indicate the DL RX beam selection (step 604) using the DL-TCI field in the DL-related DCI (that carries the DL grant, such as DCI format 1_1 in NR). In this case, the DL-TCI indicates a reference RS (in this case, an AP-CSI-RS) representing the DL TX beam selected by the gNB. In addition, the DL-TCI can also indicate a "target" RS (e.g.

CSI-RS) that is linked to the reference RS (in this case, an AP-CSI-RS). Upon successfully decoding the DL-related DCI with the DL-TCI, the UE selects a DL RX beam and performs DL reception (such as data reception via PDSCH) with the DL RX beam associated with the reference CSI-RS (step 605).

In alternative embodiments, the gNB can use the beam report to select a DL RX beam for the UE and indicate the DL RX beam selection (step 604) using a DL-TCI field for the UE in a purpose-designed DL channel for beam indication. A purpose-designed DL channel for beam indication can be UE-specific or for a group of UEs. In this case, the DL-TCI indicates a reference RS (in this case, an AP-CSI-RS) representing the DL TX beam selected by the gNB. In addition, the DL-TCI can also indicate a "target" RS (e.g. CSI-RS) that is linked to the reference RS (in this case, an AP-CSI-RS). Upon successfully decoding the purpose-designed DL channel for beam indication with the DL-TCI, the UE selects a DL RX beam and performs DL reception (such as data reception via PDSCH) with the DL RX beam associated with the reference CSI-RS (step 605).

For the embodiments of FIG. 6A, as described above, the UE selects the DL RX beam from the reference RS (in this case AP-CSI-RS) index signaled via the DL-TCI field. In this case, the CSI-RS resources (or, in general, the DL RS resources including CSI-RS, SSB, or a combination of the two) configured for the UE as the reference RS resources can be linked to (or associated with) "beam metric" reporting such as CRI/L1-RSRP or L1-SINR.

With respect to FIG. 6B, a DL multi-beam operation 610 starts with the gNB signaling to a UE an aperiodic SRS (AP-SRS) trigger or request (step 611). This trigger can be included in a DCI (either UL-related or DL-related). Upon receiving and decoding the AP-SRS trigger, the UE transmits an AP-SRS to the gNB (step 612) so that the gNB can measure the UL propagation channel and select a DL RX beam for the UE for DL, assuming beam correspondence holds.

The gNB can then indicate the DL RX beam selection (step 613) using the DL-TCI field in the DL-related DCI (that carries the DL grant, such as DCI format 1_1 in NR). In this case, the DL-TCI indicates a reference RS (in this case, an AP-SRS) representing the selected DL RX beam. In addition, the DL-TCI can also indicate a "target" RS (e.g. CSI-RS) that is linked to the reference RS (in this case, an AP-SRS). Upon successfully decoding the DL-related DCI with the DL-TCI, the UE performs DL reception (such as data reception via PDSCH) with the DL RX beam indicated by the DL-TCI (step 614).

In alternative embodiments, the gNB can indicate the DL RX beam selection (step 613) using a DL-TCI field for the UE in a purpose-designed DL channel for beam indication. A purpose-designed DL channel for beam indication can be UE-specific or for a group of UEs. In this case, the DL-TCI indicates a reference RS (in this case, an AP-SRS) representing the selected DL RX beam. In addition, the DL-TCI can also indicate a "target" RS (e.g. CSI-RS) that is linked to the reference RS (in this case, an AP-SRS). Upon successfully decoding a purpose-designed DL channel for beam indication with the DL-TCI, the UE performs DL reception (such as data reception via PDSCH) with the DL RX beam indicated by the DL-TCI (step 614).

For the embodiments of FIG. 6B, as described above, the UE selects the DL RX beam based on the UL TX beam associated with the reference RS (AP-SRS) index signaled via the DL-TCI field.

Figure 6C:
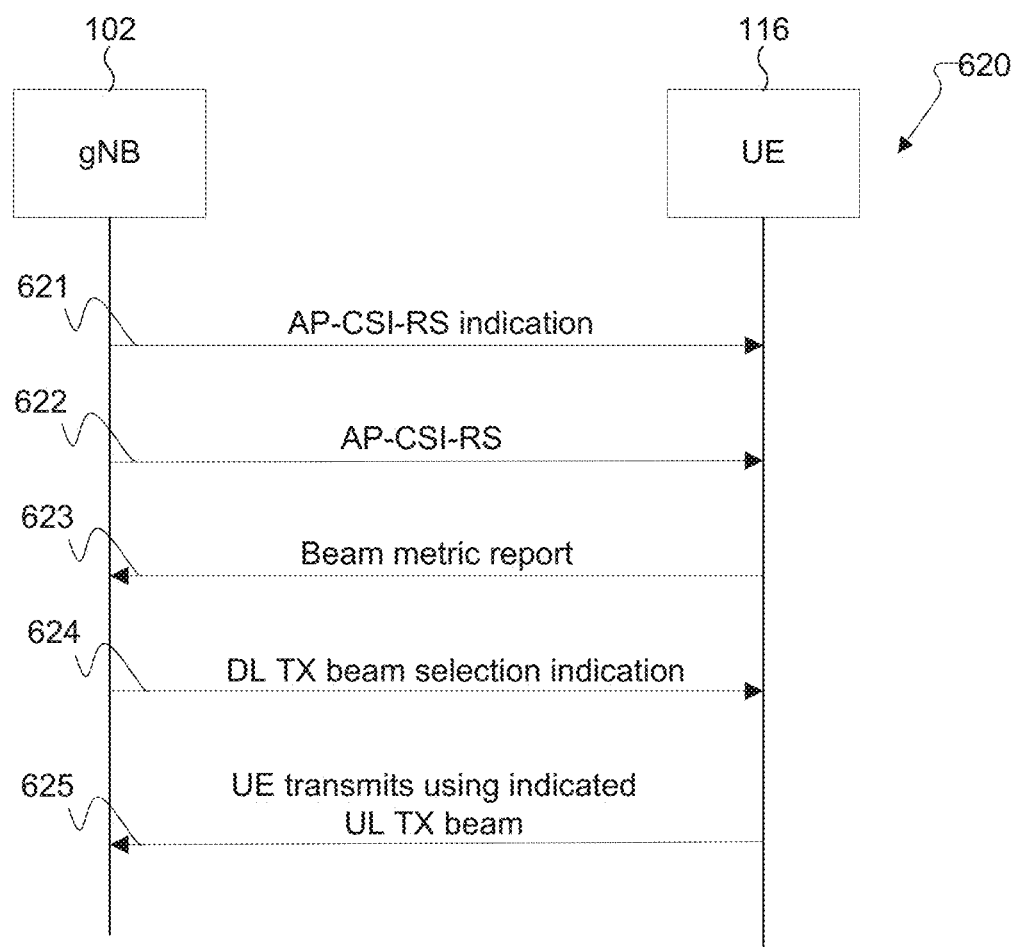
FIGS. 6C and 6D illustrate examples of UL multi-beam operations according to embodiments of the present disclosure.
Figure 6D:
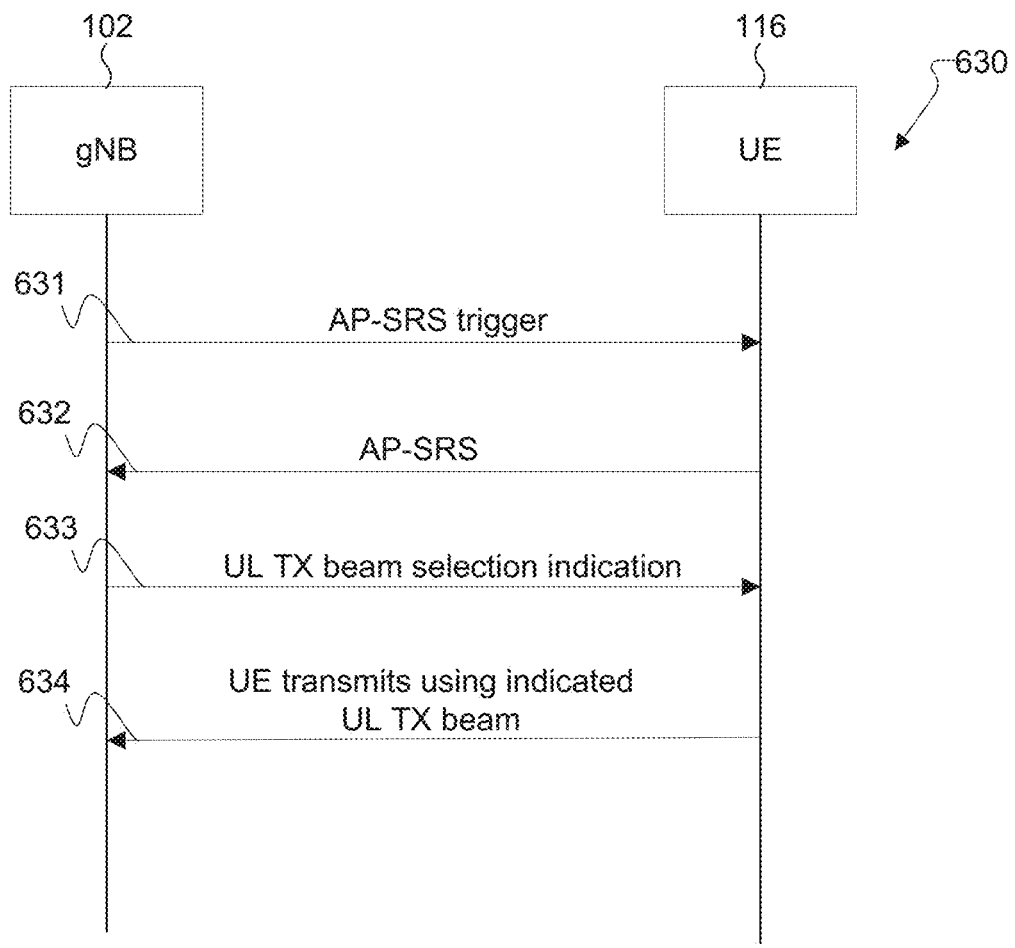

Turning to the examples of FIGS. 6C and 6D, for UL multi-beam operation, the gNB selects a UL RX beam for every UL TX beam (which corresponds to a reference RS) that the gNB expects to receive from the UE. When a UL RS (such as an SRS or DMRS) is used as the reference RS, the gNB triggers or configures the UE to transmit the UL RS (which is associated with a selection of UL TX beam). The gNB, upon receiving and measuring the UL RS, selects a UL RX beam. As a result, a TX-RX beam pair is derived. The gNB can perform this operation for all the configured reference RSs (either per reference RS or by "beam sweeping") and determine all the TX-RX beam pairs associated with all the reference RSs configured to the UE.

When a DL RS (such as a CSI-RS or SSB) is used as the reference RS (pertinent when DL-UL beam correspondence or reciprocity holds), the gNB transmits the RS to the UE (for UL, and by reciprocity this corresponds to a UL RX beam). In response, the UE measures the reference RS (and in the process selects a UL TX beam) and reports the beam metric associated with the quality of the reference RS. In this case, the UE determines the TX-RX beam pair for every configured (DL) reference RS. Therefore, although this knowledge is unavailable to the gNB, the UE—upon receiving a reference RS (hence a UL RX beam) indication from the gNB—can select the UL TX beam from the knowledge of all the TX-RX beam pairs.

FIGS. 6C and 6D illustrate examples of UL multi-beam operations according to embodiments of the present disclosure. The examples of FIGS. 6C and 6D utilize UL-TCI-based UL beam indication after the gNB receives some transmission from the UE. In the embodiment of FIG. 6C, aperiodic CSI-RS is transmitted by the gNB and measured by the UE. This embodiment can be used, for instance, when UL-DL beam correspondence holds. In the embodiment of FIG. 6D, aperiodic SRS is triggered by the gNB and transmitted by the UE so that the gNB can measure the UL channel quality for the purpose of assigning a UL TX beam. This embodiment can be used whether UL-DL beam correspondence holds or not. Although aperiodic RS is used in these two examples, periodic or semi-persistent RS can also be used.

With respect to FIG. 6C, a UL multi-beam operation 620 starts with the gNB signaling to a UE an aperiodic CSI-RS (AP-CSI-RS) trigger or indication (step 621). This trigger or indication can be included in a DCI (either UL-related or DL-related, either separately or jointly signaled with an aperiodic CSI request/trigger) and indicate transmission of an AP-CSI-RS in a same (zero time offset) or later (>0 time offset) slot or sub-frame. Upon receiving the AP-CSI-RS transmitted by the gNB (step 622), the UE measures the AP-CSI-RS and, in turn, calculates and reports a "beam metric" (indicating quality of a particular TX beam hypothesis) (step 623). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB can use the beam report to select a UL TX beam for the UE and indicate the UL TX beam selection (step 624) using the UL-TCI field in the UL-related DCI (that carries the UL grant, such as DCI format 0_1 in NR). In this case, the UL-TCI indicates a reference RS (in this case, an AP-CSI-RS) representing the UL RX beam selected by the gNB. In addition, the UL-TCI can also indicate a "target" RS (e.g. SRS) that is linked to the reference RS (in this case, an AP-CSI-RS). Upon successfully decoding the UL-related DCI with the UL-TCI, the UE selects a UL TX beam and performs UL transmission (such as data transmission on PUSCH) with the UL TX beam associated with the reference CSI-RS (step 625).

In alternative embodiments, the gNB can use the beam report to select a UL TX beam for the UE and indicate the UL TX beam selection (step 624) using a UL-TCI field for the UE in a purpose-designed DL channel for beam indication. A purpose-designed DL channel for beam indication can be UE-specific or for a group of UEs. In this case, the UL-TCI indicates a reference RS (in this case, an AP-CSI-RS) representing the UL RX beam selected by the gNB. In addition, the UL-TCI can also indicate a "target" RS (e.g. SRS) that is linked to the reference RS (in this case, an AP-CSI-RS). Upon successfully decoding a purpose-designed DL channel for beam indication with the UL-TCI, the UE selects a UL TX beam and performs UL transmission (such as data transmission on PUSCH) with the UL TX beam associated with the reference CSI-RS (step 625).

For the embodiments of FIG. 6C, as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (or associated with) "beam metric" reporting such as CRI/L1-RSRP or L1-SINR.

With respect to FIG. 6D, a UL multi-beam operation 630 starts with the gNB signaling to a UE an aperiodic SRS (AP-SRS) trigger or request (step 631). This trigger can be included in a DCI (either UL-related or DL-related). Upon receiving and decoding the AP-SRS trigger, the UE transmits an AP-SRS to the gNB (step 632) so that the gNB can measure the UL propagation channel and select a UL TX beam for the UE.

The gNB can then indicate the UL TX beam selection (step 633) using the UL-TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g., an SRS) that is linked to the reference RS (in this case, an AP-SRS). Upon successfully decoding the UL-related DCI with the UL-TCI, the UE performs UL transmission (such as data transmission on PUSCH) with the UL TX beam indicated by the UL-TCI (step 634).

In alternative embodiments, a gNB can indicate the UL TX beam selection (step 633) using a UL-TCI field for the UE in a purpose-designed DL channel for beam indication. A purpose-designed DL channel for beam indication can be UE-specific or for a group of UEs. In this case, the UL-TCI indicates a reference RS (in this case, an AP-SRS) representing the selected UL TX beam. In addition, the UL-TCI can also indicate a "target" RS (e.g., an SRS) that is linked to the reference RS (in this case, an AP-SRS). Upon successfully decoding a purpose-designed DL channel for beam indication with the UL-TCI, the UE performs UL transmission (such as data transmission on PUSCH) with the UL TX beam indicated by the UL-TCI (step 634).

For the embodiments of FIG. 6D, as described above, the UE selects the UL TX beam from the reference RS (in this case SRS) index signaled via the UL-TCI field.

In the above example embodiments of FIGS. 6A-6D, the DL and UL beam indication are separate (decoupled). That is to say, the DL beam indication is based on DL-TCI indication and the UL beam indication is based on UL-TCI. In some embodiments, a joint-TCI that couples DL and UL beam indications (either partially or fully) can be used in place of a DL-TCI or UL-TCI above. An example use case of the joint-TCI indication is in a reciprocal system in which UL-DL beam correspondence holds.

Figure 7:
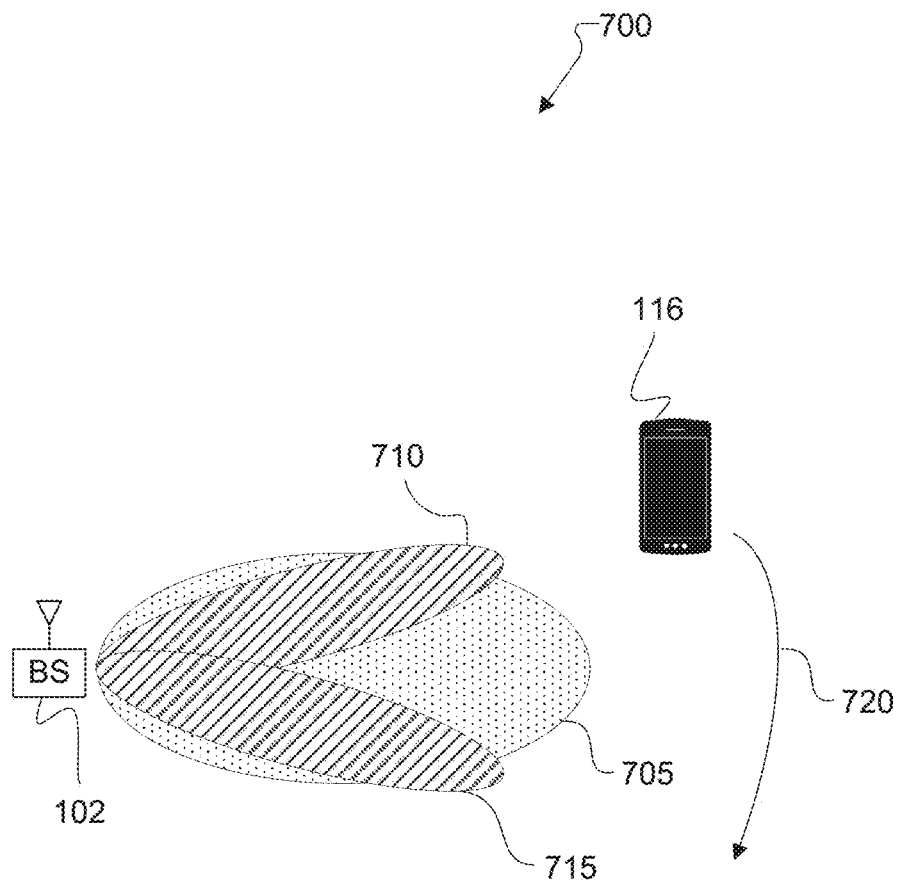
FIG. 7 illustrates an example beam configuration according to embodiments of the present disclosure.
Figure 8:
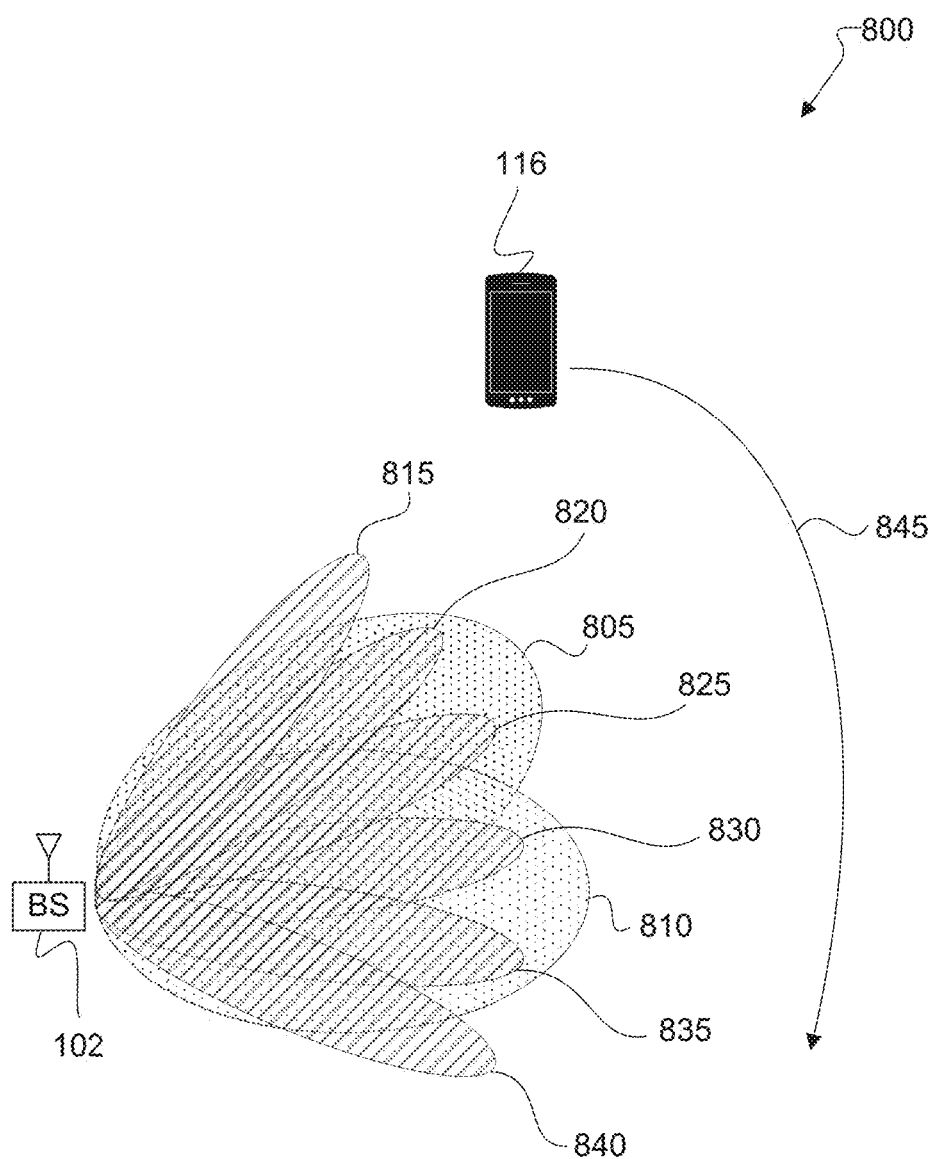
FIG. 8 illustrates an example beam configuration according to embodiments of the present disclosure.

FIGS. 7 and 8 discussed below relate to design aspects of TCI channel beams—that is, beams that convey a TCI, SRI, or any other suitable beam indication parameter or field. As discussed above, any given beam in a system has a corresponding TCI state that characterizes the beam, and accordingly the TCI channel beams convey, e.g., a TCI that indicates a TCI state. Additionally, a beam used for a channel may be referred to as the TCI state of the channel, e.g., the TCI state of the TCI channel can refer to the TCI channel beam, or the TCI state of the DL channel (DL-TCI) or the TCI state of the UL channel (UL-TCI) can refer to the DL channel beam or UL channel beam, respectively.

FIG. 7 illustrates an example beam configuration 700 according to embodiments of the present disclosure. The example of FIG. 7 illustrates communications between a gNB 102 and a UE 116, however it is understood that the example of FIG. 7 could apply to any suitable beamforming-capable wireless communication devices.

The beam configuration 700 includes a wide TCI channel beam 705 and narrow UE-specific channel beams 710 and 715. Wide and narrow are relative terms—a wide beam can encompass more than one narrow beam. In this example, the wide TCI channel beam 705 encompasses several narrow UE-specific channel beams 710 and 715 and transmits the TCI channel from the gNB 102 to the UE 116. The narrow UE-specific channel beams 710 and 715 are used for transmission or reception of UE-specific DL or UL channels that are not for beam indication (e.g., data channels such as PDSCH or PUSCH, or control channels such as PDCCH or PUCCH, for the specific UE 116). In some embodiments, the narrow beams can be used for transmission or reception of UE group channels or UE common channels (e.g., data or control channels for multiple UEs). In some embodiments, the wide beams can be used for transmission or reception of UE group channels or UE common channels (e.g., data or control channels for multiple UEs). In some embodiments, a UE-specific channel beam can only be used for transmission of either data or control channels, while in other embodiments, a UE-specific channel beam can be used for transmission of both data and control channels. In the latter case, the data channels and control channels for the specific UE can be said to share a common TCI state. This can also correspond to the UL channels and DL channels for the specific UE sharing a common TCI state.

As illustrated in FIG. 7, the UE 116 begins in the coverage area of the narrow beam 710 and moves along path 720, which takes it out of the coverage area of narrow beam 710 and into the coverage area of narrow beam 715. This represents a change in channel conditions that causes the narrow beam suitable for transmission or reception of UE-specific DL or UL channels to change from narrow UE-specific channel beam 710 (the old beam or current beam) to narrow UE-specific channel beam 715 (the new beam). Because both narrow beams are within the coverage area of the wide TCI channel beam 705, a TCI channel transmitted on the wide TCI channel beam 705 can be used to indicate the narrow UE-specific channel beam 715 as the new beam for transmission or reception of UE-specific DL or UL channels (e.g., by conveying a TCI indicating the TCI state of the narrow UE-specific channel beam 715).

In embodiments where the narrow UE-specific channel beams 710 and 715 are for UE-specific DL channels (e.g., PDSCH or PDCCH), the TCI channel can be: a PDCCH channel with DL-related DCI that includes at least DL-TCI or joint-TCI, a PDCCH channel with UL-related DCI that includes DL-TCI, UL-TCI, or joint-TCI, a purpose-designed DL channel for beam indication that includes at least DL-TCI or joint-TCI, or a MAC CE that conveys TCI. In such embodiments, from the perspective of the gNB 102 the TCI channel beams and the UE-specific channel beams are TX beams, while from the perspective of the UE 116 they are RX beams.

In embodiments where the narrow UE-specific channel beams 710 and 715 are for UE-specific UL channels (e.g., PUSCH, PUCCH, or PRACH), the TCI channel can be: a PDCCH channel with UL-related DCI that includes at least UL-TCI or joint-TCI, a PDCCH channel with DL-related DCI that includes UL-TCI, DL-TCI, or joint-TCI, a purpose-designed DL channel for beam indication that includes least UL-TCI or joint-TCI, or a MAC CE that conveys TCI. In such embodiments, from the perspective of the gNB 102 the TCI channel beam is a TX beam and the UE-specific channel beams are RX beams, while from the perspective of the UE 116 the TCI channel beam is an RX beam and the UE-specific channel beams are TX beams.

Although FIG. 7 illustrates one example of a beam configuration 700, various changes may be made to FIG. 7. For example, any number of narrow UE-specific channel beams and wide TCI channel beams could be present to provide coverage of additional spatial resources. Additionally, any number of UEs or other beamforming-capable wireless communication devices could be in communication with the gNB 102.

FIG. 8 illustrates an example beam configuration 800 according to embodiments of the present disclosure. The example of FIG. 8 illustrates communications between a gNB 102 and a UE 116, however it is understood that the example of FIG. 8 could apply to any suitable beamforming-capable wireless communication devices.

The beam configuration 800 includes wide TCI channel beams 805 and 810, and narrow UE-specific channel beams 815, 820, 825, 830, 835, and 840. As noted above, wide and narrow are relative terms—a wide beam can encompass more than one narrow beam. In this example, the wide TCI channel beam 805 encompasses narrow UE-specific channel beams 815, 820, 825, and 830. The wide TCI channel beam 810 encompasses narrow UE-specific channel beams 825, 830, 835, and 840. Wide TCI channel beams 805 and 810 have partially overlapping coverage areas, and as a result the narrow UE-specific channel beams 825 and 830 are encompassed by both of the wide TCI channel beams 805 and 810.

As illustrated in FIG. 8, the UE 116 begins in the coverage area of the narrow beam 815 and moves along path 845, which takes it sequentially through the coverage areas of narrow beams 820, 825, 830, and finally 835. This represents a change in channel conditions that causes the narrow beam suitable for transmission or reception of UE-specific DL or UL channels to change from narrow UE-specific channel beam 815 (the old beam or current beam) sequentially to narrow UE-specific channel beams 820, 825, 830, and 835 (sequential new beams). Additionally, the UE 116 begins in the coverage area of wide TCI channel beam 805 and moves into the coverage area of wide TCI channel beam 810. This represents a change in channel conditions that causes the wide beam suitable for transmission of TCI channels to change from wide TCI channel beam 805 to wide TCI channel beam 810.

In this embodiment, a TCI channel can indicate both a TCI state of a new beam to be used for the next transmission of narrow UE-specific channels and a TCI state of a new beam to be used for the next transmission of the TCI channel. For example, because narrow UE-specific channel beams 825 and 830 are encompassed by both of the wide TCI channel beams 805 and 810, a TCI channel transmitted on the wide TCI channel beam 805 that indicates a change from narrow UE-specific channel beam 820 (the old UE-specific channel beam) to 825 (the new UE-specific channel beam) can also indicate a change from wide TCI channel beam 805 (the old TCI channel beam) to 810 (the new TCI channel beam). The beam indication for the new TCI channel beam can be explicit (e.g., a TCI indicating the TCI state of wide TCI channel beam 810) or implicit (as discussed further below). The beam indication that indicates the wide TCI channel beam 810 as the new TCI channel beam could alternatively be included in the TCI channel that indicates a change from narrow UE-specific channel beam 825 to 830, or from narrow UE-specific channel beam 830 to 835.

Implicit beam indication for the new TCI channel beam can occur in various ways. In some embodiments, the UE 116 is pre-configured (e.g., via higher layer signaling) with information that associates each narrow UE-specific channel beam with the wide TCI channel beam that encompasses it. The UE 116 can then infer, from an indication of a new narrow UE-specific channel beam, an indication of a new wide TCI channel beam. For example, if the UE 116 receives a TCI channel on the wide TCI channel beam 805 that includes a beam indication for narrow UE-specific channel beam 825 as a new UE-specific channel beam, the UE 116 can infer a beam indication for wide TCI channel beam 810 as a new TCI channel beam.

In some embodiments, the UE 116 is additionally pre-configured (e.g., via higher layer signaling) with information that associates each narrow UE-specific channel beam with the adjacent narrow UE-specific channel beams on either side. In such embodiments, the UE 116, when receiving a beam indication for a new UE-specific channel beam, can infer its direction of movement based on comparison of the TCI state of the old UE-specific channel beam and the TCI state of the new UE-specific channel beam. The UE 116 can then use this knowledge in conjunction with the pre-configured association between narrow UE-specific channel beams and wide TCI channel beams to infer a beam indication for a new TCI channel beam. For example, when narrow UE-specific channel beam 820 is the old UE-specific channel beam and the UE 116 receives a beam indication on wide TCI channel beam 805 that indicates narrow UE-specific channel beam 825 as a new UE-specific channel beam, the UE 116 can infer that it is moving towards the coverage area of wide TCI channel beam 810. From this, the UE 116 can infer a beam indication for wide TCI channel beam 810 as a new TCI channel beam. Conversely, when narrow UE-specific channel beam 825 is the old UE-specific channel beam and the UE 116 receives a beam indication on wide TCI channel beam 810 that indicates narrow UE-specific channel beam 830 as a new UE-specific channel beam, the UE infers that it is moving away from the coverage area of wide TCI channel beam 805 (and is remaining within the coverage area of wide TCI channel beam 810), so the UE does not infer a beam indication for wide TCI channel beam 805, in spite of the fact that narrow UE-specific channel beam 830 is associated with wide TCI channel beam 805.

After the UE 116 has received, on the wide TCI channel beam 805, the TCI channel that indicates the wide TCI channel beam 810 as the new TCI channel beam (either explicitly or implicitly), the subsequent TCI channel will be transmitted on the wide TCI channel beam 810, indicating the next new beam to be used for the narrow UE-specific channels. In this way, as the UE travels along path 845 it is able to receive TCIs indicating, sequentially, new narrow UE-specific channel beams 820, 825, 830, and 835 as new beams for transmission or reception of UE-specific DL or UL channels, and TCIs indicating new wide TCI channel beam 810 as a new beam for reception of TCI channels.

Similar to FIG. 7, in embodiments where the narrow UE-specific channel beams 815, 820, 825, 830, 835, and 840 are for UE-specific DL channels (e.g., PDSCH or PDCCH), the TCI channel can be: a PDCCH channel with DL-related DCI that includes at least DL-TCI or joint-TCI, a PDCCH channel with UL-related DCI that includes DL-TCI, UL-TCI, or joint-TCI, a purpose-designed DL channel for beam indication that includes at least DL-TCI or joint-TCI, or a MAC CE that conveys TCI. In such embodiments, from the perspective of the gNB 102 the TCI channel beams and the UE-specific channel beams are TX beams, while from the perspective of the UE 116 they are RX beams.

Also similar to FIG. 7, in embodiments where the narrow UE-specific channel beams 815, 820, 825, 830, 835, and 840 are for UE-specific UL channels (e.g., PUSCH, PUCCH, or PRACH), the TCI channel can be: a PDCCH channel with UL-related DCI that includes at least UL-TCI or joint-TCI, a PDCCH channel with DL-related DCI that includes UL-TCI, DL-TCI, or joint-TCI, a purpose-designed DL channel for beam indication that includes least UL-TCI or joint-TCI, or a MAC CE that conveys TCI. In such embodiments, from the perspective of the gNB 102 the TCI channel beam is a TX beam and the UE-specific channel beams are RX beams, while from the perspective of the UE 116 the TCI channel beam is an RX beam and the UE-specific channel beams are TX beams.

Although FIG. 8 illustrates one example of a beam configuration 800, various changes may be made to FIG. 8. For example, any number of narrow UE-specific channel beams and wide TCI channel beams could be present to provide coverage of additional spatial resources. Additionally, any number of UEs or other beamforming-capable wireless communication devices could be in communication with the gNB 102.

In the examples of FIGS. 7 and 8 above, the TCI channel beam is a separate beam from the UE-specific channel beams, and only the TCI channel is transmitted on the TCI channel beam. In other embodiments, the TCI channel beam and the UE-specific channel beam can be the same beam (i.e., share the same TCI state). That is, both the TCI channel and at least one of the UE-specific data or control DL or UL channels can be transmitted using one beam.

Furthermore, in the example of FIG. 8 above, embodiments are disclosed in which a TCI channel can indicate both a TCI state of a new UE-specific channel beam and a TCI state of a new TCI channel beam. In some embodiments, both TCI states (i.e., of the UE-specific channel beam and of the TCI channel beam) can be indicated in a single TCI channel transmission. That is, both TCI states can be explicitly signaled in one TCI channel transmission, or the TCI state of the TCI channel beam can be derived from a TCI channel transmission that explicitly signals only the TCI state of the UE-specific channel beam (as discussed above).

In other embodiments, the TCI state for the new TCI channel beam and the TCI state for the new UE-specific channel beam can be explicitly signaled in different transmissions. In some embodiments, the same TCI channel can be used, in different transmissions, to indicate TCI states for both the TCI channel beam and the UE-specific channel beam. In other embodiments, two different TCI channels can be used.

For example, a first TCI channel can be used to indicate new TCI states for the UE-specific channel beam, and a second TCI channel can be used to indicate a new TCI state for the TCI channel beam. In some such embodiments, both TCI channels are transmitted on the TCI channel beam. In other such embodiments, the first TCI channel is transmitted on the TCI channel beam, and the second TCI channel is transmitted on a UE-specific beam.

In embodiments using first and second TCI channels, the first and second TCI channels can each be transmitted using different signaling. For example, the first TCI channel can be an L1 control channel (e.g., DCI) and the second TCI channel can be a MAC CE (or vice versa). Alternatively, the first TCI channel can be a first L1 control channel (e.g., DCI) and the second TCI channel can be a second L1 control channel (e.g., DCI). Furthermore, the first TCI channel can be a first MAC CE and the second TCI channel can be a second MAC CE.

In a multi-path environment, beams linking a gNB to a UE can suddenly appear and disappear due blockage caused by motion of the UE and objects in the surrounding environment. When a downlink beam that has been used for communication of beam indications (i.e., a TCI channel beam) between a gNB and a UE disappears, the network will not be able to indicate a new beam selection to a UE. This could lead to beam failure and potentially RLF. However, there could be candidate beams available on other multi-paths between the gNB and the UE. Initially, a gNB selects a strongest or most suitable beam from the set of candidate beams for communication with UE, but when the selected beam fails, a gNB and UE pair can fall back quickly to another beam from the set of candidate beams (i.e., a second strongest beam or a second most suitable beam). This process can be referred to as a type of dynamic beam adaptation. This requires the gNB and the UE to maintain a list (or set) of candidate beams, or at least a list (or subset) of the top N candidate beams from the set of candidate beams, where N is a value that can be configured through higher layer signaling (e.g., RRC signaling), through MAC signaling (e.g., using a MAC CE), or through L1 signaling.

In some embodiments, the list of top N candidate beams can be updated semi-statically or dynamically as the channel conditions change (i.e., as the environment changes), and new beams appear and disappear. The list of top N candidate beams can be updated through higher layer signaling (e.g., RRC signaling), through MAC signaling (e.g., using a MAC CE), or through L1 signaling.

The list of top N candidate beams can be an ordered list, where the order can be based on signal quality (or beam quality). Signal quality can be determined based on L1-SINR, L1-RSRP, estimated BLER, or any other quality metric (or beam metric). Alternatively, the list of top N candidate beams can be partially ordered or unordered. The gNB and the UE can use a subset of beams from the list of top N candidate beams to communicate at any given time, e.g., where the list of top N candidate beams is an ordered list, a subset of the best candidate beams from the list of top N candidate beams can be selected. In one example, a single beam (e.g., the best beam from the list of top N candidate beams) is used for communication at one given time.

The TCI channel can be a relatively light channel, meaning that the number of bits conveyed on the TCI channel is relatively small. In such cases, the transmission and decoding complexity of the TCI channel is relatively low, and it is therefore possible to simultaneously transmit or receive the TCI channel on multiple beams with only a small increase to the overall system complexity and resource utilization.

In embodiments wherein TCI channels are simultaneously transmitted on multiple beams in a multi-path environment, a gNB and a UE pair maintain a list of the top N candidate beams available for communication between the gNB and the UE. The gNB and UE select a subset of $N_1$ beams from the list of the top N candidate beams to be used for transmission or reception of UE-specific UL or DL channels (i.e., data or control channels not for beam indication), where $N_1 <= N$. In one example, $N_1=1$ (i.e., a single beam is used for UE-specific DL or UL channels). The beams selected to be used for UL and DL channels can be different or can be the same. Furthermore, the UE monitors all of a subset of $N_2$ beams from the list of the top N candidate beams for the TCI channel using multiple hypothesis decoding, where $N_2 <= N$.

In one such embodiment, the gNB can transmit the TCI channel using any subset of $N_3$ beams out of the $N_2$ beams. That is, the gNB can transmit the TCI channel on a subset of the beams being monitored by the UE for the TCI channel. In one example, $N_{3=1}$ and $N_2=N$ (i.e., the UE monitors all beams in the list of the top N candidate beams for the TCI channel, and the gNB transmits the TCI channel using one of the beams from the list). In this embodiment, the gNB determines the $N_3$ beams to use for transmission of the TCI channel based on the current multi-path environment to attempt to ensure reliable reception of the TCI channel at the UE. That is, the gNB attempts to determine beams that are not blocked to use for transmission of the TCI channel.

In another such embodiment, the gNB can transmit the TCI channel using all of the $N_2$ beams. That is, the gNB transmits the TCI channel using all of the beams being monitored by the UE for the TCI channel. In one example, $N_2=N$ (i.e., the UE monitors all beams in the list of the top N candidate beams for the TCI channel, and the gNB transmits the TCI channel using all beams from the list). In this embodiment, even if some of the $N_2$ beams are blocked, the transmission of the TCI channel can still be received by the UE using one of the $N_2$ beams that is not blocked.

Figure 9:
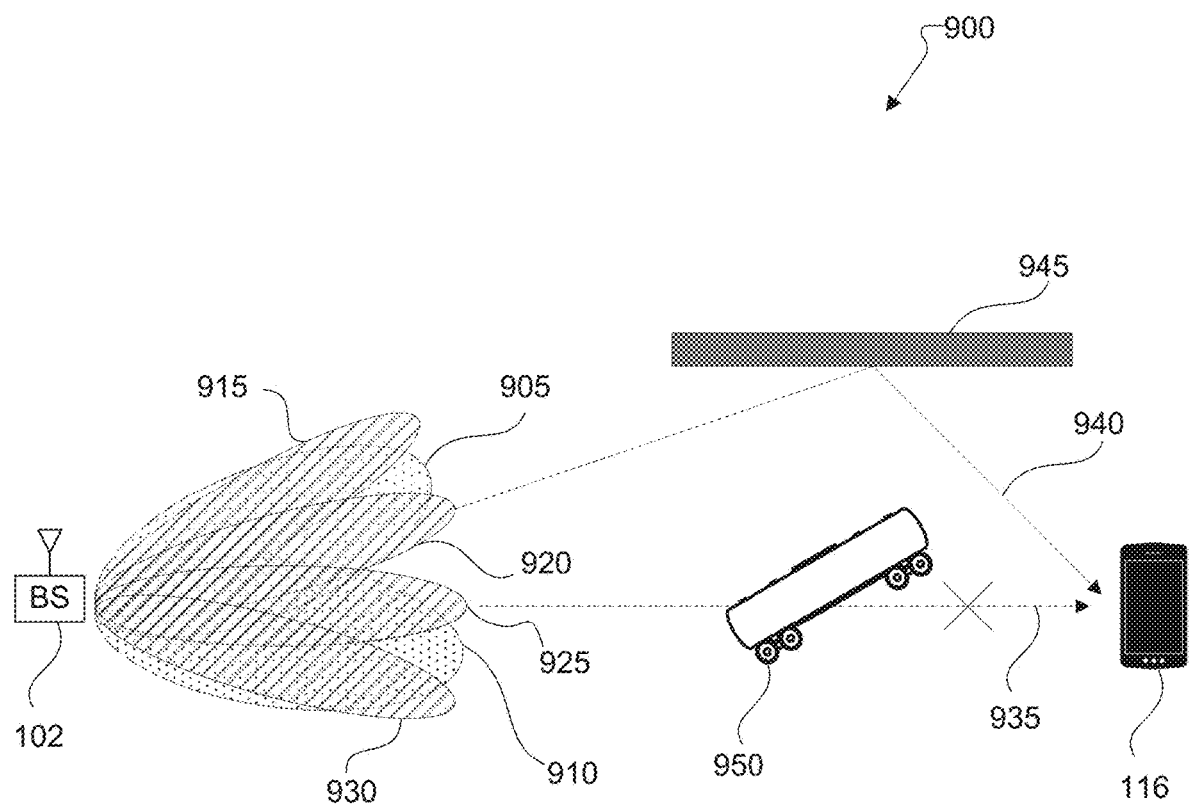
FIG. 9 illustrates an example dynamic beam adaptation process in a multi-path beam environment according to various embodiments of the present disclosure.

FIG. 9 illustrates an example dynamic beam adaptation process in a multi-path beam environment 900 according to embodiments of the present disclosure. The example of FIG. 9 illustrates communications between a gNB 102 and a UE 116, which form a device pair, however it is understood that the example of FIG. 9 could apply to any pair of suitable beamforming-capable wireless communication devices.

The multi-path environment 900 includes wide TCI channel beams 905 and 910, and narrow UE-specific channel beams 915, 920, 925, and 930. As noted above, wide and narrow are relative terms—a wide beam can encompass more than one narrow beam. In this example, the wide TCI channel beam 905 encompasses narrow UE-specific channel beams 915 and 920. The wide TCI channel beam 910 encompasses narrow UE-specific channel beams 925 and 930.

In this example, wide TCI channel beam 910 and narrow UE-specific channel beam 925 can be received by the UE 116 along path 935, which is a direct path. Wide TCI channel beam 905 and narrow UE-specific channel beam 920 can be received by the UE 116 along path 940, which is a reflection off of an object 945 (e.g., a building) in the multi-path environment 900. Accordingly, wide TCI channel beams 905 and 910 and narrow UE-specific channel beams 920 and 925 may be candidate beams for communication between gNB 102 and UE 116. Furthermore, the UE 116 is able to receive beams on both of paths 935 and 940 simultaneously.

Meanwhile, in some embodiments the narrow UE-specific channel beams 915 and 930 are not suitable for communication between the gNB 102 and the UE 116. Accordingly, narrow UE-specific channel beams 915 and 930 are not candidate beams for communication between gNB 102 and UE 116. In other embodiments, the narrow UE-specific channel beams 915 and 930 could be received by the UE 116, but not reliably. In this case, the narrow UE-specific channel beams 915 and 930 may be candidate beams but are not top candidate beams for communication between gNB 102 and UE 116.

In some embodiments, the gNB 102 determines, for example through measurement of beam metrics by the gNB 102 or beam reporting from the UE 116, the set of candidate beams for communication to include the wide TCI channel beams 905 and 910 and the narrow UE-specific channel beams 920 and 925. This set can also correspond to the set of the top N candidate beams for communication, where N=4 (e.g., in the case where beams 915 and 930 could be received by the UE 116, but not reliably). The gNB 102 can configure the UE 116 with this set of candidate beams for communication between the gNB 102 and UE 116 as disclosed above. In the above embodiments, the set of candidate beams for communication between the UE 116 and the gNB 102 is based on the current state of the multi-path environment 900, but in other embodiments, the set of candidate beams for communication between the UE 116 and the gNB 102 can be based on a predicted future state of the multi-path environment 900. For example, based on a trajectory of motion of the UE 116, based on anticipated changes in a surrounding environment, or based on motion of the gNB 102.

Additionally, the gNB 102 can also determine, based on the above measurements, a subset of the candidate beams that is currently most suitable for conveying the TCI channel (i.e., current TCI channel beams). For example, the gNB 102 can determine that wide TCI channel beams 905 and 910 are currently the most suitable TCI channel beams (e.g., because the UE 116 is capable of monitoring multiple TCI channel beams simultaneously). The gNB 102 can then configure the UE 116 with the subset of beams {905, 910} as a set of candidate beams that are available for reception of the TCI channel. The configuration of the UE 116 with this set of candidate beams can be done, e.g., via higher layer signaling as disclosed above.

Furthermore, the gNB 102 can also determine, based on the above measurements, subsets of the candidate beams that are currently most suitable for conveying the UE-specific DL and UL channels (i.e., current UE-specific channel beams). For example, the gNB 102 can determine that UE-specific channel beams 920 and 925 are currently the two most suitable UE-specific channel beams, and accordingly can determine the subset of beams {920, 925} as a set of candidate beams that are available for transmission and reception UE-specific channels. In some embodiments, (e.g., when the UE 116 is capable of transmitting or receiving multiple UE-specific channel beams simultaneously), the gNB 102 then configures the UE 116 with the subset of beams {920, 925} as a current set of beams to use for transmission and reception of UE-specific channels. In other embodiments (e.g., when the UE 116 is not capable of transmitting or receiving multiple UE-specific channel beams simultaneously), the gNB 102 configures the UE 116 with only the most suitable beam from this determined subset. For example, the gNB 102 can determine that UE-specific channel beam 925 is currently the most suitable UE-specific channel beam, and can then configure the UE 116 with the beam 925 as the current beam to use for transmission and reception of UE-specific channels. The configuration of the UE 116 with these sets of candidate beams can be done, e.g., via higher layer signaling as disclosed above.

A particular example of the above dynamic beam adaptation wherein the UE is not capable of transmitting or receiving multiple UE-specific channel beams simultaneously is now discussed further. In this example, the gNB 102 determines that the subset of narrow UE-specific channel beams 920 and 925 are suitable (or most suitable) for transmission and reception of UE-specific channels with the UE 116, and accordingly determines the subset of beams {920, 925} as a set of candidate beams that are available for transmission and reception UE-specific channels. The gNB 102 further determines that the narrow UE-specific channel beam 925 is the most suitable (or best) beam of this subset, and accordingly configures the UE 116 to use narrow UE-specific channel beam 925 for UE-specific DL and UL channels. The gNB 102 additionally determines that wide TCI channel beams 905 and 910 are suitable beams for transmission of the TCI channel, and configures the UE 116 with the subset of beams {905, 910} as a set of candidate beams that are available for reception of the TCI channel.

In this example, after the above configuration has occurred, the gNB 102 and the UE 116 perform transmission and reception of UE-specific DL and UL channels using the narrow UE-specific channel beam 925, and the UE 116 monitors both of the wide TCI channel beams 905 and 910 for the TCI channel. Additionally, the gNB 102 performs beam measurements, the UE 116 performs beam reporting, and the gNB 102 determines whether changes to the multi-path environment 900 have occurred which necessitate updating the sets of most suitable TCI channel beams and UE-specific channel beams.

Subsequently, an object 950 (e.g., a vehicle) moves to block the path 935, rendering the beams 910 and 925 unsuitable for communication between the gNB 102 and the UE 116. That is, a change to the multi-path environment 900 occurs which causes transmission and reception of channels using beams wide TCI channel beam 910 or narrow UE-specific channel beam 925 to become unreliable. It is understood that this is one example of path blockage, and any number of other causes of blockage could be substituted. For example, the UE 116 could be in motion while the object 950 is stationary, or the user of the UE 116 could rotate to put their body in the path 935, thus triggering a blockage due to MPE concerns.

After this blockage occurs, the gNB 102 can determine, for example through measurement of beam metrics by the gNB 102 or beam reporting (or the lack thereof) from the UE 116, that the path 935 is blocked. The gNB 102 then determines that a fallback to a second most suitable beam is desirable or necessary (e.g., to avoid RLF). In this example, the gNB 102 identifies narrow UE-specific channel beam 920 as the second most suitable candidate beam in the set of candidate beams {920, 925} available for transmission and reception UE-specific channels, and determines to use narrow UE-specific channel beam 920 as the new UE-specific channel beam.

In some embodiments, the gNB 102 then transmits a TCI channel on all of the suitable TCI channel beams (i.e., both of the wide TCI channel beams 905 and 910) with a TCI that indicates the narrow UE-specific channel beam 920 as a new (or subsequent) UE-specific channel beam. This is feasible, for example, when the TCI channel is a relatively light channel, and transmission of the TCI channel on multiple beams requires only a small increase to overall system complexity and resource utilization. As the UE 116 is configured to perform multiple hypothesis decoding to monitor the subset of beams {905, 910} for the TCI channel, the UE 116 will reliably receive the TCI channel using the wide TCI channel beam 905 via path 940, which is still unblocked, even though the wide TCI channel beam 910 is blocked and cannot reliably be received. In other examples the gNB 102 can transmit the TCI channel on a subset of suitable TCI channel beams that includes more than one TCI channel beam but less than all available TCI channel beams, while the UE 116 monitors all available TCI channel beams.

In other embodiments, when the gNB 102 determines that the path 935 is blocked, the gNB 102 also determines that the path 940 is still unblocked, and thus determines to use wide TCI channel beam 905 to transmit the TCI channel including the TCI that indicates the narrow UE-specific channel beam 920 as a new (or subsequent) UE-specific channel beam. This may be preferable, for example, when transmission of the TCI channel on multiple beams would require an unacceptable amount of increase to overall system complexity and resource utilization. As the UE 116 is configured to perform multiple hypothesis decoding to monitor the subset of beams {905, 910} for the TCI channel, the UE 116 will reliably receive the TCI channel using the wide TCI channel beam 905 via path 940.

In some embodiments of the above examples, the TCI channel can be a PDCCH channel with DL-related DCI that includes at least DL-TCI or joint-TCI, or a purpose-designed DL channel for beam indication that includes at least DL-TCI or joint-TCI. In such embodiments, UE-specific channel beams (e.g., narrow UE-specific channel beams 920 and 925) can be DL channel beams from the perspective of the UE 116 (e.g., for transmission of a PDSCH or PDCCH not for beam indication). In other embodiments of the above examples, the TCI channel can be a PDCCH channel with UL-related DCI that includes at least UL-TCI or joint-TCI, or a purpose-designed DL channel for beam indication that includes at least UL-TCI or joint-TCI. In such embodiments, the UE-specific channel beams can be UL channel beams from the perspective of the UE 116 (e.g., for transmission of a PUSCH, PUCCH, or PRACH). In yet other embodiments, the UE-specific channel beams can be used as both UL channel beams and DL channel beams (e.g., when the TCI channel includes a join-TCI).

In other examples of dynamic beam adaptation in the multi-path environment 900, the UE 116 can be capable of performing beam measurements and determining autonomously when it is necessary to select a new UE-specific UL channel beam for UL transmissions to the gNB 102. For example, the UE 116 can determine that a path of a current UE-specific UL channel is blocked, which would cause the UE to be unable to reliably convey beam reporting to the gNB 102 to report the measured change in the multi-path environment 900, which could result in beam failure or RLF. This process can be referred to as a type of dynamic beam adaptation. In these examples, the UE 116 first receives a transmission from the gNB 102 configuring (or indicating) a set of candidate beams for communication between the gNB 102 and UE 116 as disclosed above (e.g., the set including the wide TCI channel beams 905 and 910 and the narrow UE-specific channel beams 920 and 925). There can be a common candidate set for all channels, or there can be different candidate subsets for each channel type (e.g., one candidate subset for UE-specific UL channels and another candidate set for UE-specific DL channels, or one candidate subset for data channels and another candidate set for control channels).

The UE 116 then receives a transmission from the gNB 102 indicating a current UE-specific UL channel beam from within the set of candidate beams. For example, the gNB 102 could indicate the narrow UE-specific channel beam 925 as the current UE-specific UL channel beam, as described above (e.g., based on the gNB 102's determination that the narrow UE-specific channel beam 925 is the most suitable or best beam of the candidate UE-specific channel beams). The UE 116 can then measure and evaluate the multi-path environment 900 to determine whether the current UE-specific UL channel beam is still suitable. In some embodiments, this evaluation of the multi-path environment 900 is performed as part of the beam reporting process, wherein the UE 116 measures beam quality of beams in the configured set of candidate beams. The UE 116 could perform this measurement periodically, or it can be event triggered (e.g., each time the UE 116 has a UL transmission to send on the UL channel beam).

Subsequently, the object 950 moves to block the path 935, as described above. The next time the UE 116 measures the multi-path environment 900, the UE 116 determines that the narrow UE-specific channel beam 925 is no longer suitable for UL transmissions (i.e., that it is blocked). The UE 116 then determines one or more other beams from the set of candidate beams that are suitable for UL transmissions, and transmits a beam report to the gNB 102 on one of these beams to inform the gNB 102 that the current assigned UE-specific UL channel beam is no longer suitable. For example, the UE 116 could determine that the narrow UE-specific channel beam 920 is still suitable for UL transmissions, and transmit the beam report to the gNB 102 on the narrow UE-specific channel beam 920.

In some embodiments, the beam report includes a beam ID (e.g., a TCI state) of one preferred beam from the set of candidate beams for subsequent communications. In another embodiment, the beam report includes beam IDs of a set of preferred beams from the set of candidate beams for subsequent communications. Alternatively, the beam report can implicitly indicate a preferred beam for subsequent communications based on, e.g., the time resources, frequency resources, sequence, signature, or preamble of the UL channel on which the beam report is transmitted. The beam report can also include beam metrics associated with the preferred beam or beams indicated by the beam report (e.g., metrics of beam quality based on L1-SINR, L1-RSRP, estimated BLER, or any other quality metric).

In the above embodiments, the gNB 102 can select a new UE-specific UL channel beam for subsequent UL communications based on the information in the beam report and indicate the new UE-specific UL channel beam to the UE 116 via a TCI channel, as discussed above. In other embodiments, the UE 116 does not transmit a beam report to the gNB 102, but instead autonomously selects a suitable new UE-specific UL channel beam (e.g., the preferred beam) from the set of candidate beams based on the measurements performed by the UE 116. For example, the UE could select the narrow UE-specific channel beam 920 as the new UE-specific UL channel beam. The UE can then transmit UL data or control channels (e.g., PUSCH or PUCCH) on the new UE-specific UL channel beam, which the gNB 102 can interpret as an indication that the old UE-specific UL channel beam is no longer suitable.

In some of the above embodiments, the channel conveying the beam report can be a dedicated PUCCH or PUSCH channel that carries a beam report configured as discussed above. In other embodiments, the channel carrying the beam report can be preceded by a beam indication channel that indicates to the gNB 102 a beam ID of a beam for transmission of a subsequent channel conveying the beam report. This can assist the gNB 102 to identify the beam report. The beam indication channel can implicitly indicate a beam for the subsequent beam report based on the beam of the beam used for transmission of the beam indication channel itself, or based on the time resources, frequency resources, sequence, signature, or preamble of the beam indication channel itself. The beam indication channel can alternatively carry a payload that explicitly indicates a beam for the subsequent beam report. Furthermore, the beam indication channel can use a combination of any of the above to indicate the beam for the subsequent beam report.

In any of the above embodiments, the beam report or beam indication channel can be piggy-backed on a channel used for HARQ-ACK feedback transmission. For example, a HARQ-ACK response can be multiplexed with a beam ID for a preferred beam as discussed above, or a beam ID for a subsequent beam report as discussed above. A HARQ-ACK response can also implicitly indicate a preferred beam as discussed above, or can indicate a beam for a subsequent beam report as discussed above, based on the beam used for transmission of the HARQ-ACK response. A HARQ-ACK response can alternatively implicitly indicate, based on the time resources, frequency resources, sequence, signature, or preamble of the HARQ-ACK response, a preferred beam as discussed above, or a beam for a subsequent beam report as discussed above.

The above channels used for conveying the beam report, the beam indication, the HARQ-ACK, or other indication of the blockage of the current UE-specific UL channel beam can be transmitted using one of the suitable beams for communication between the UE 116 and gNB 102, as discussed above. Alternatively, these channels could be transmitted using multiple suitable beams from the set of candidate beams for communication between the UE 116 and gNB 102. Furthermore, these channels could be transmitted using one or more beams from a second set of candidate beams for communication between the UE 116 and gNB 102, wherein the second set of beams have a wider beam width than the first set.

In cases where the UE 116 transmits these channels on multiple suitable beams, the gNB 102 can perform multiple beam hypothesis decoding to decode the multiple suitable beams (whether in the first set or second set of candidate beams). Furthermore, the gNB 102 can be able to perform multiple resource hypothesis decoding on one received beam or on different received beams (e.g., for time or frequency resources, sequence, signature, or preamble of channels received on the beam or beams). Additionally, the gNB 102 can be able to perform multiple payload hypothesis decoding on one received beam or on different received beams.

Although FIG. 9 illustrates one example dynamic beam adaptation process in a multi-path beam environment 900, various changes may be made to FIG. 9. For example, any number of narrow UE-specific channel beams and wide TCI channel beams could be present to provide coverage of additional spatial resources over any number of paths in the multi-path beam environment 900. Additionally, any number of UEs or other beamforming-capable wireless communication devices could be in communication with the gNB 102. Furthermore, the TCI channel beams and UE-specific channel beams could share be the same beams (i.e., they could share common TCI states).

When multiple UEs are present in a multi-path environment (such as multi-path environment 900 of FIG. 9), the UEs may be grouped together into a UE group or UE subgroups that share a TCI channel. That is, one shared (or common) TCI channel can include TCIs (or any other suitable beam indication parameter) for multiple UEs that comprise a group or subgroup of UEs. This is feasible when all of the UEs in a UE group or UE subgroup are able to receive the same TCI channel.

In one embodiment, if a group of UEs are co-located in a small geographical area, they may be within the coverage area of a single wide beam used as a TCI channel beam, which conveys a shared TCI channel to the group of UEs. For example, this embodiment could apply to UEs located on a mass transit vehicle such as a bus or a train, as all UEs on the vehicle will be traveling together following a same trajectory, and thus they will share similar characteristics and will remain within the coverage area of a single wide TCI channel beam as the multi-path environment changes.

In another embodiment, if a group of UEs are spread out across a geographical area, multiple TCI channel beams (which can cover all or part of a cell) may be used to convey shared TCI channels to various groups or subgroups of the UEs. In such an embodiment, the TCI channel beams can be semi-statically configured, and whether a UE belongs to a group of UEs addressed by a shared TCI channel is determined based on whether the UE is within the coverage area of the same semi-statically configured TCI channel beam. Alternatively, TCI channel beams are dynamically updated based on the locations of UEs within a group of UEs that are addressed by a shared TCI channel.

Even when UEs within a UE group share a TCI channel (i.e., when they are within the coverage area of a same wide TCI channel beam), different UEs within a UE group may or may not share narrow beams used for transmission or reception of DL or UL data and control channels (i.e., they may or may not be within the coverage area of a same narrow DL or UL channel beam). This can depend in part on the spread of UEs within a geographical area. In some embodiments, a same narrow beam can be used for transmission or reception of DL or UL data and control channels for all UEs in a UE group. In such a case, one shared (or common) TCI (or any other suitable beam indication parameter) can be conveyed to all UEs within the UE group by a shared TCI channel, and is used by all UEs within the UE group. The one shared TCI can be determined based on the measurement reports of a "lead UE" within the UE group that is addressed by the shared TCI channel, as discussed below.

In some embodiments, a different narrow beam can be used for transmission or reception of DL or UL data and control channels for each UE within a UE group. For example, when all UEs of the UE group are within the coverage area of one wide TCI channel beam, but each UE is within the coverage area of a different narrow beam. In this case, a different TCI (or any other suitable beam indication parameter) can be conveyed by a shared TCI channel for each UE of the UE group addressed by the shared TCI channel (which is transmitted to the UE group using the single wide TCI channel beam).

In other embodiments, a UE group comprises a number of subgroups of UEs, and each UE within one of the subgroups of UEs can share a same narrow beam for transmission or reception of DL or UL data and control channels, while each subgroup of UEs uses a different narrow beam for transmission or reception of DL or UL data and control channels (e.g., when all UEs of the UE group are within the coverage area of one wide TCI channel beam, but each subgroup of UEs is within the coverage area of a separate narrow beam). Hence, a different shared TCI (or any other suitable beam indication parameter) can be conveyed by a shared TCI channel for each subgroup of UEs of the UE group addressed by the shared TCI channel. The different shared TCI (or any other suitable beam indication parameter) for each subgroup of UEs can be determined based on the measurement reports of a lead UE within each subgroup of UEs, as discussed below.

In the above embodiments including a UE group or UE subgroups, a "lead UE" of a UE group or UE subgroup can provide information or measurement reports that assist a gNB in determining a beam to use for a TCI channel beam, or determining a beam indication (e.g., a TCI) to be conveyed by a shared TCI channel for the UE group or UE subgroup. A lead UE can be configured by a gNB from UEs within a UE group or UE subgroup. This configuration can be performed using higher layer signaling (e.g., RRC signaling, a MAC CE, or L1 control signaling). In some embodiments, a lead UE can be a special UE associated with an environment, wherein the special UE is known (or can be assumed) to have characteristics that are shared with the other UEs in the UE group or UE subgroup. For example, for UEs in a train, a lead UE can be a special UE associated with the train (e.g., installed in the train), or a special UE associated with (e.g., installed in) a carriage, or part of a carriage or multiple carriages, in the train.

In other embodiments including a UE group or UE subgroups, there is no lead UE for the UE group or UE subgroups. In such cases, all or a subset of UEs within a UE group or within a UE subgroup can provide information or measurement reports that assist a gNB in determining a beam to use for a TCI channel beam, or determining a beam indication (e.g., a TCI) to be conveyed by a shared TCI channel for the UE group or UE subgroup.

In any of the above embodiments including a UE group or UE subgroups in a multi-path environment, the TCI channel beams can be determined based on the current state of the multi-path environment. Alternatively, the TCI channel beams can be determined based on a predicted future state of the multi-path environment. For example, based on a trajectory of motion of a UE group, based on a trajectory of motion of lead UE within a UE group, based on anticipated changes in a surrounding environment, or based on motion of a gNB.

Figure 10:
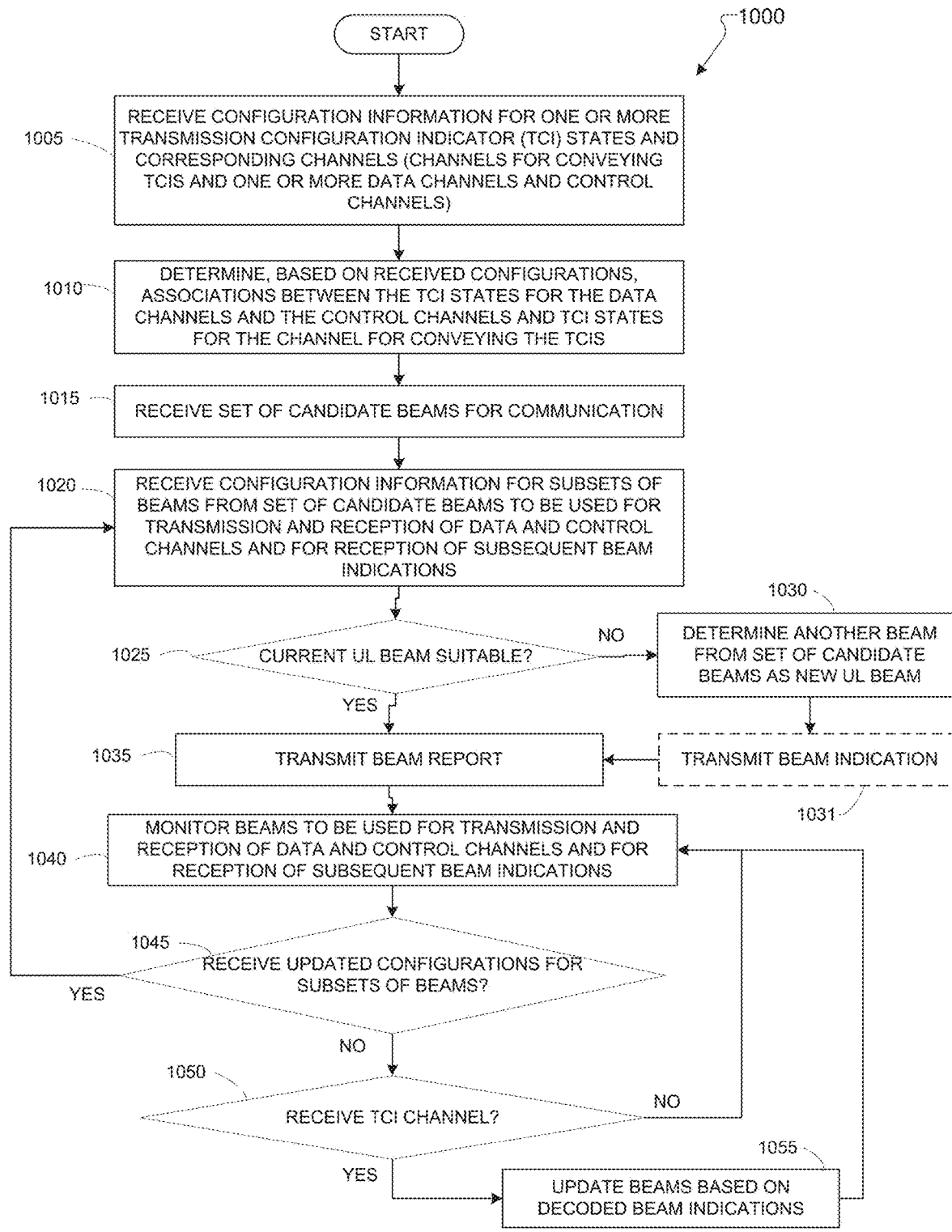
FIG. 10 illustrates an example process for dynamic beam adaptation by a UE in a multi-path environment in accordance with various embodiments of the present disclosure.
Figure 11:
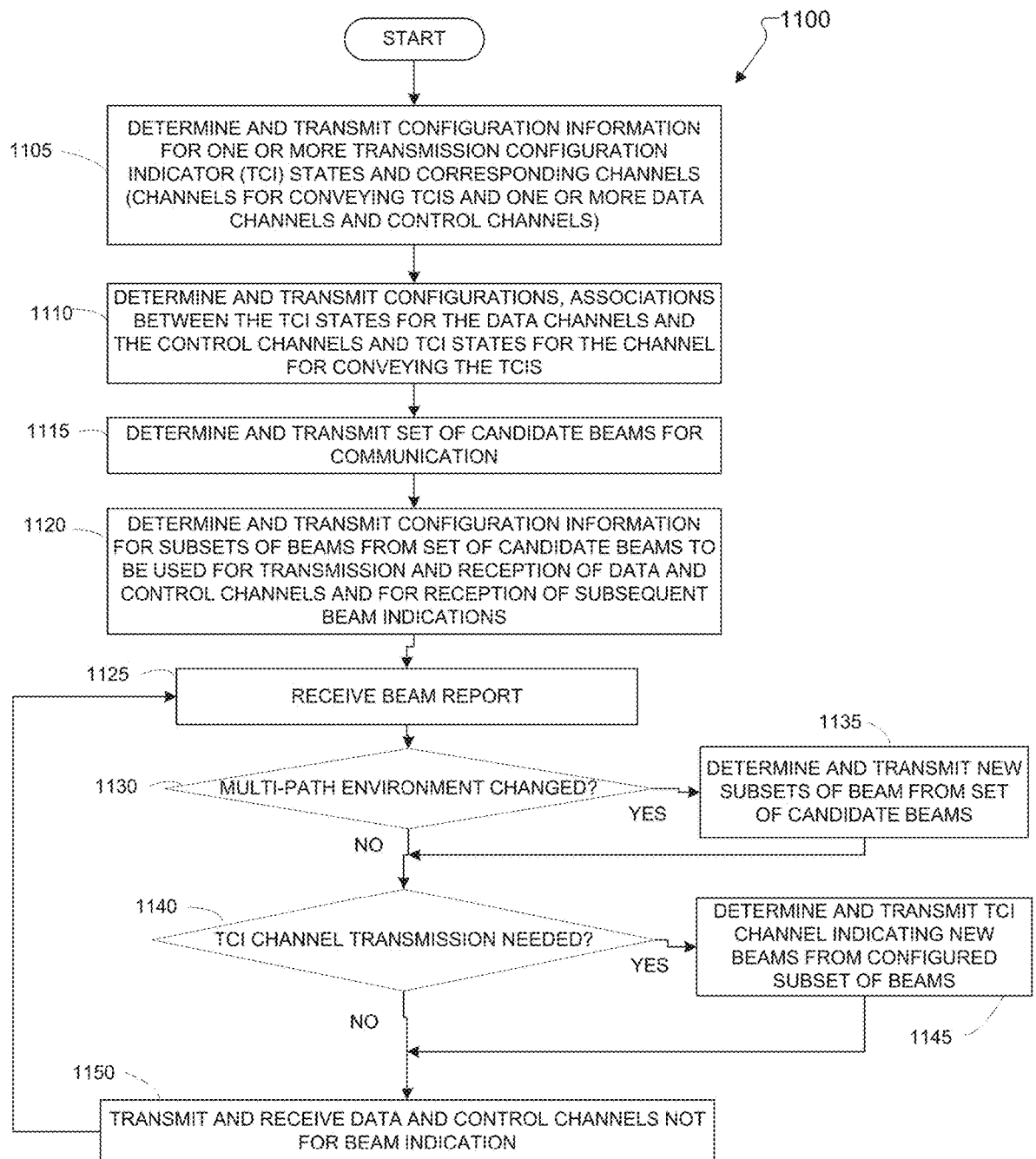
FIG. 11 illustrates an example process for dynamic beam adaptation by a gNB in a multi-path environment in accordance with various embodiments of the present disclosure.

FIGS. 10 and 11 illustrate examples of a process for dynamic beam adaptation in a multi-path environment in accordance with various embodiments of the present disclosure. The process depicted in FIG. 10 is performed by the UE 116, and the process depicted in FIG. 11 is performed by the gNB 102, however it is understood that the processes of FIGS. 10 and 11 could be performed by any suitable beamforming-enabled wireless receiver and transmitter, respectively.

FIG. 10 illustrates an example process 1000 for dynamic beam adaptation by a UE in a multi-path environment in accordance with various embodiments of the present disclosure. The process begins by the UE receiving configuration information for one or more TCI states and corresponding channels, e.g., a channel for conveying TCIs (i.e., TCI channel) and one or more data channels and control channels (i.e., UE-specific channels) (step 1005). The UE can receive this configuration information via higher layer signaling (e.g., RRC signaling), a MAC CE, or L1 control signaling.

The data channels and the control channels can include one or more UE-specific channels, which can be DL channels and UL channels.

The configuration information can include, for example, a set of TCI states corresponding to $ND_K$ narrow UE-specific DL channel beams (e.g., DL-TCI states), which the UE may assume are used for PDSCH or PDCCH channels (e.g., data or control channels not for beam indication), a set of TCI states corresponding to $NU_M$ narrow UE-specific UL channel beams (e.g., UL-TCI states) which the UE may assume are used for uplink channels (e.g., data or control channels such as PUSCH, or PUCCH, or PRACH), and a set of TCI states corresponding to $W_N$TCI channel beams which the UE may assume are used for receiving the TCI channel (e.g., the channel for conveying TCIs). These sets of TCI states can represent all TCI states useable by the gNB.

In some cases, narrow DL channel beams and narrow UL channel beams can be from a same set that can be indicated by a joint-TCI. Additionally, the TCI channel beams can be from the same set that is indicated by the joint-TCI. In other embodiments, the narrow DL channel beams and TCI channel beams can be from a same set.

Next, the UE determines, based on received configurations, associations between the TCI states for the data channels and control channels (i.e., UE-specific channels) and the TCI states for the channels for conveying TCIs (i.e., TCI channels) (step 1010). In some embodiments, these associations are determined based on configurations received from the gNB that defines, or generates, the associations.

These associations can include an association between any one or more of the TCI states for the one or more UE-specific channels and one of the TCI states for the channel for conveying the TCIs—that is, a "one-to-one" association wherein one and only one narrow beam is encompassed by one TCI channel beam (e.g., the narrow beam and the TCI channel beam share a same TCI state and are the same beam). The associations can further include an association between multiple of the TCI states for the one or more UE-specific channels and the one of the TCI states for the channel for conveying the TCIs—that is, a "many-to-one" association wherein multiple narrow beams are encompassed by and associated with one and only one TCI channel beam (as shown in the example of FIG. 7). The associations can also include an association between at least one of the TCI states for the one or more UE-specific channels and multiple of the TCI states for the channel for conveying the TCIs—that is, a "many-to-many" association wherein a TCI channel beam encompasses multiple narrow beams, and a narrow beam is encompassed by more than one TCI channel beam (e.g., the TCI channel beams overlap as in the example of FIG. 8). In some embodiments, at least some of the data channels and some of the control channels share the same TCI state—that is, some of the data and control channels share a beam.

These associations can allow for implicit mapping between the TCI states for the UE-specific channels and the TCI states for the one or more TCI channels, as discussed herein above. For example, the UE can generate a table that maps a given TCI state within set $ND_K$ (of the narrow UE-specific DL channel beams) or within set $NU_M$ (of the narrow UE-specific UL channel beams) to a given TCI state within set $W_N$ (of the TCI channel beams). These tables could then be referenced by the UE to determine which TCI states for TCI channel beams are known to encompass a TCI state for a DL or UL channel beam indicated to the UE by a beam indication. In some embodiments, when the DL and UL channels share beams, only one table is generated which maps TCI states from both sets $ND_K$ and $NU_M$ to set $W_N$. In other embodiments, a DL-TCI table or UL-TCI table which includes a mapping between a reference RS and target RSs and QCL types is extended to include one or more reference RSs for a TCI Channel and corresponding QCL types.

Next, the UE receives configuration information for a set of candidate beams for communication with the gNB in the multi-path environment (step 1015). For example, the UE is configured with TCI states for each beam that is available for communication with the gNB in the multi-path environment. This can include a set of TCI states from among the TCI states configured at step 1005. As discussed above, set of candidate beams can be based on a current multi-path environment between the UE and the gNB or based on a predicted multi-path environment between the UE and the gNB. The gNB can configure the UE with this set of candidate beams through higher layer signaling, as discussed above.

Next, the UE receives configuration information for a subset of beams from the set of candidate beams to be used for transmission and reception of DL and UL data and control channels (i.e., UE-specific channels) and for reception of a channel conveying a subsequent beam indication (i.e., TCI channel beams) (step 1020). For example, the UE can be configured with a set of TCI channel beams {Wn} from the set of candidate beams and from the set $W_N$, which correspond to a most suitable set of wide TCI channel beams between the gNB and the UE for conveying the TCI channel. Additionally, the UE can be configured with a narrow UE-specific channel beam $ND_k$ from the set of candidate beams and from the set $ND_K$, which corresponds to a most suitable narrow UE-specific channel beam between the gNB the UE for conveying DL channels. In embodiments where the UE is capable of receiving multiple beams simultaneously, $ND_k$ can correspond to a subset $\{ND_k\}$ of narrow UE-specific channel beams. Furthermore, the UE can be configured with a narrow UE-specific channel beam $NU_m$ from the set of candidate beams and from the set $NU_M$, which corresponds to a most suitable narrow UE-specific channel beam between the gNB the UE for conveying UL channels. In embodiments where the UE is capable of transmitting multiple beams simultaneously, $NU_m$ can correspond to a subset $\{NU_m\}$ of narrow UE-specific channel beams. These subsets can be determined based on measurements reports from a UE, based on gNB measurements, or based on any other means to measure a channel. The gNB can configure the UE with these subsets of candidate beams through higher layer signaling, as discussed above.

The UE then performs beam measurements on the multi-path environment, and determines from the beam measurements whether the current narrow channel beam for conveying UL data and control channels (i.e., the current narrow UE-specific UL channel beam) is still suitable (step 1025). For example, as described above, the UE measures beam quality of the beams in the set of candidate beams configured at step 1015. The UE can perform step 1025 periodically (e.g., step 1025 can occur at other points in the process 1000), or step 1025 can be event triggered (e.g., step 1025 can occur when the UE attempts to transmit a UL channel). If the current narrow UE-specific UL channel beam is still suitable, the process continues to step 1035. If the UE determines that the current narrow UE-specific UL channel beam is no longer suitable (e.g., a blockage has occurred in the path of the beam), the process continues to step 1030.

At step 1030, when the UE has determined the current narrow UE-specific UL channel beam is no longer suitable, the UE determines one or more preferred beams from the set of candidate beams configured at step 1015 to use as one or more new narrow UE-specific UL channel beams. That is, the one or more preferred beams are to be used for subsequent UL transmissions.

The UE next transmits a beam report to the gNB (step 1035). The beam report can include the UE's measurements on the multi-path environment performed at step 1025. The beam report can additionally include an indication of the one or more preferred beams selected at step 1030 for use as new narrow UE-specific UL channel beams. The beam report can be transmitted using a physical uplink shared channel (PUSCH), a physical uplink control channel (PUCCH), or a feedback acknowledgement for another received transmission (e.g., a HARQ ACK). The indication of the preferred beams can include a set of beam identifiers (beam IDs) for the one or more preferred beams, or an implicit indication based on channel resources of the UL channel used for the beam report, or based on the beam used to transmit the UL channel including the beam report, as discussed above.

In some cases, the UE next transmits a UL channel that includes a beam indication for a beam to be used for transmission of the UL channel that includes the beam report (step 1031). The beam to be used for transmission of the UL channel that includes the beam report can, for example, be the one or more preferred beams selected at step 1030, or can be another beam from the set of candidate beams configured at step 1015. In some cases, the beam to be used for transmission of the UL channel that includes the beam report can be determined from a second set of candidate beams for communication with the gNB, where the second set of candidate beams has wider beam widths than the set of candidate beams configured at step 1015.

The UE then monitors the set of beams for reception of subsequent beam indications (e.g., the TCI channel beams) configured at step 1020 and uses the set of beams for transmission and reception of data and control channels (e.g., the UE-specific UL and DL channel beams) configured at step 1020 to receive or transmit other data and control channels (e.g., data and control channels not for beam indication) (step 1040). For example, as discussed above, the UE can perform multiple hypothesis decoding to monitor all of the set $\{W_n\}$ of TCI channel beams simultaneously for the TCI channel. As mentioned above, transmission of a UL channel at step 1040 can trigger the beam measurements of step 1025. In some embodiments, when the UE has determined a preferred beam or beams for UL channel transmission at step 1030, the UE can perform UL transmission at step 1040 using the preferred beam or beams as a new UE-specific UL channel beam.

Next, the UE determines whether configuration information for updated subsets of beams from the set of candidate beams to be used for one or more of transmission and reception of DL or UL data and control channels (i.e., UE-specific DL or UL channels) or reception of a channel conveying a subsequent beam indication (i.e., TCI channel beams) has been received at step 1040 (step 1050). If so, the process returns to step 1020, and the UE is configured with the updated subsets of beams from the set of candidate beams. If not, the process continues to step 1045.

Next, the UE determines whether a TCI channel has been received at step 1040 (step 1050). For example, the UE can decode all of the set $\{W_n\}$ of TCI channel beams to determine whether a TCI channel has been received on any one of the TCI channel beams. If not, the process returns to step 1040. If so, the UE obtains a decoded beam indication (e.g., a decoded TCI) from the decoded set of TCI channel beams, and the process continues on to step 1055.

When the UE receives a channel conveying a subsequent beam indication (i.e., a TCI channel) and obtains a decoded beam indication (i.e., a TCI) at step 1050, the UE determines, based on the decoded beam indication, one or more subsequent beams to be used for subsequent communications, from the subset of beams configured at step 1020, and updates the TCI states to be used for DL or UL channels or for the TCI state channel accordingly (step 1055). For example, as disclosed herein above, the decoded beam indication can be one or more TCIs that indicate one or both of a new TCI state $ND_k$ or set of new TCI states $\{ND_k\}$ for DL channel beams, new TCI state $NU_m$ or set of new TCI states $\{NU_m\}$ for UL channel beams, or new set of TCI states $\{W_n\}$ for the TCI channel beams. The TCIs can also include a joint TCI that indicates both the new TCI states $ND_k$ and $NU_m$, or new TCI state sets $\{ND_k\}$ and $\{NU_m\}$. The process then returns to step 1040.

In some embodiments, the channel for conveying the beam indication (i.e., the TCI channels) also includes beam indications (i.e., TCIs) for other UEs. This can occur when the UE is part of a UE group or subgroup with the other UEs. In these embodiments, the beam indication signaling can be shared between all UEs, shared with only some of the other UEs, or can be unique for each UE in the group.

FIG. 11 illustrates an example process 1100 for beam management by a gNB in accordance with various embodiments of the present disclosure. The process begins by the gNB determining and transmitting configuration information for one or more TCI states and corresponding channels, e.g., a channel for conveying TCIs (i.e., TCI channel) and one or more data channels and control channels (i.e., UE-specific channels) (step 1105). The gNB can transmit this configuration information via higher layer signaling (e.g., RRC signaling), a MAC CE, or L1 control signaling. The data channels and the control channels can include one or more UE-specific channels, which can be DL channels and UL channels.

The configuration information can include, for example, a set of TCI states corresponding to $ND_K$ narrow UE-specific DL channel beams (e.g., DL-TCI states), which the gNB may assume are used for PDSCH or PDCCH channels (e.g., data or control channels not for beam indication), a set of TCI states corresponding to $NU_M$ narrow UE-specific UL channel beams (e.g., UL-TCI states) which the gNB may assume are used for uplink channels (e.g., data or control channels such as PUSCH, or PUCCH, or PRACH), and a set of TCI states corresponding to $W_N$ TCI channel beams which the gNB may assume are used for receiving the TCI channel (e.g., the channel for conveying TCIs).

In some cases, narrow DL channel beams and narrow UL channel beams can be from a same set that can be indicated by a joint-TCI. Additionally, the TCI channel beams can be from the same set that is indicated by the joint-TCI. In other embodiments, the narrow DL channel beams and TCI channel beams can be from a same set. The sets $ND_K$, $NU_M$, and $W_N$ can each be UE-specific (i.e., configured for one specific UE), common to a group of UEs within a cell, or common to all UEs within a cell.

Next, the gNB determines and transmits configurations for associations between the TCI states for the data channels and control channels (i.e., UE-specific channels) and the TCI states for the channels for conveying TCIs (i.e., TCI channels) (step 1110).

These associations can include an association between any one or more of the TCI states for the one or more UE-specific channels and one of the TCI states for the channel for conveying the TCIs—that is, a "one-to-one" association wherein one and only one narrow beam is encompassed by one TCI channel beam (e.g., the narrow beam and the TCI channel beam share a same TCI state and are the same beam). The associations can further include an association between multiple of the TCI states for the one or more UE-specific channels and the one of the TCI states for the channel for conveying the TCIs—that is, a "many-to-one" association wherein multiple narrow beams are encompassed by and associated with one and only one TCI channel beam (as shown in the example of FIG. 7). The associations can also include an association between at least one of the TCI states for the one or more UE-specific channels and multiple of the TCI states for the channel for conveying the TCIs—that is, a "many-to-many" association wherein a TCI channel beam encompasses multiple narrow beams, and a narrow beam is encompassed by more than one TCI channel beam (e.g., the TCI channel beams overlap as in the example of FIG. 8). In some embodiments, at least some of the data channels and some of the control channels share the same TCI state—that is, some of the data and control channels share a beam.

These associations can allow for implicit mapping between the TCI states for the UE-specific channels and the TCI states for the one or more TCI channels, as discussed herein above.

Next, the gNB determines and transmits configuration information for a set of candidate beams for communication with the UE in the multi-path environment (step 1115). For example, the gNB determines TCI states for each beam that is available for communication with the UE in the multi-path environment and transmits this configuration information to the UE. This can include a set of TCI states from among the TCI states configured at step 1105. As discussed above, set of candidate beams can be based on a current multi-path environment between the UE and the gNB or based on a predicted multi-path environment between the UE and the gNB. The gNB can configure the UE with this set of candidate beams through higher layer signaling, as discussed above.

Next, the gNB determines and transmits configuration information for a subset of beams from the set of candidate beams to be used for transmission and reception of DL and UL data and control channels (i.e., UE-specific channels) and for transmission of a channel conveying a subsequent beam indication (i.e., TCI channel beams) (step 1120). For example, the gNB can determine a set of TCI channel beams $\{W_n\}$ from the set of candidate beams and from the set $W_N$, which correspond to a most suitable set of wide TCI channel beams between the gNB and the UE for conveying the TCI channel. Additionally, the gNB can determine a narrow UE-specific channel beam $ND_k$ from the set of candidate beams and from the set $ND_K$, which corresponds to a most suitable narrow UE-specific channel beam between the gNB the UE for conveying DL channels. In embodiments where the UE is capable of receiving multiple beams simultaneously, $ND_k$ can correspond to a subset $\{ND_k\}$ of narrow UE-specific channel beams. Furthermore, the gNB can determine a narrow UE-specific channel beam $NU_m$ from the set of candidate beams and from the set $NU_M$, which corresponds to a most suitable narrow UE-specific channel beam between the gNB the UE for conveying UL channels. In embodiments where the UE is capable of transmitting multiple beams simultaneously, $NU_m$ can correspond to a subset $\{NU_m\}$ of narrow UE-specific channel beams. These subsets can be determined based on measurements reports from a UE, based on gNB measurements, or based on any other means to measure a channel. The gNB can configure the UE with these subsets of candidate beams through higher layer signaling, as discussed above.

The gNB next receives a beam report from the UE (step 1125). The beam report can include measurements performed by the UE on the multi-path environment. The beam report can additionally include an indication of the one or more preferred beams selected by the UE for use as new narrow UE-specific UL channel beams. The beam report can be received using a physical uplink shared channel (PUSCH), a physical uplink control channel (PUCCH), or a feedback acknowledgement for another received transmission (e.g., a HARQ ACK). The indication of the preferred beams can include a set of beam identifiers (beam IDs) for the one or more preferred beams, or an implicit indication based on channel resources of the UL channel used by the UE for the beam report, or based on the beam used by the UE to transmit the UL channel including the beam report, as discussed above.

In some cases, before receiving the beam report, the gNB receives a UL channel that includes a beam indication for a beam to be used for transmission of the UL channel that includes the beam report. In such cases, the gNB receives the beam report of step 1125 on this beam. The beam to be used for transmission of the UL channel that includes the beam report can, for example, be the one or more preferred beams selected by the UE, as discussed above, or can be another beam from the set of candidate beams configured at step 1115. In some cases, the beam to be used for transmission of the UL channel that includes the beam report can be determined from a second set of candidate beams for communication with the gNB, where the second set of candidate beams has wider beam widths than the set of candidate beams configured at step 1115.

Next, the gNB determines whether the multi-path environment has changed, requiring an update to the subsets of beams from the set of candidate beams configured at step 1120 to be used for one or more of transmission and reception of DL or UL data and control channels (i.e., UE-specific DL or UL channels) or reception of a channel conveying a subsequent beam indication (i.e., TCI channel) (step 1130). For example, the gNB can determine, based on beam measurements or the beam report from the UE, that one or more of the UE-specific DL or UL channel beams or TCI channel beams configured at step 1120 are no longer available (i.e., have been blocked). If the beams are still suitable, the process continues to step 1140. If the gNB determines that beams are blocked, then the process moves to step 1135.

At step 1135, the gNB determines one or more new subsets of beams from the candidate set of beams configured at step 1110 to be used for one or more of transmission and reception of DL or UL data and control channels (i.e., UE-specific DL or UL channels) or reception of a channel conveying a subsequent beam indication (i.e., TCI channel), as necessary, and transmits configuration information indicating the new subsets. For example, the gNB can use beam measurements, as discussed above, to make these determinations, and can configure this information to the UE using higher layer signaling, as discussed above.

Next, the gNB determines whether one or more of the beams used for transmission and reception of the data channels and control channel beams (i.e., UE-specific UL and DL channel beams) or the beam used to transmit the channel for conveying TCIs (i.e., TCI channel) need to be updated (step 1140). The gNB can make this determination based on, for example, measurement reports that the gNB receives from the UE, or based on the gNB's own beam measurements, as described herein above. If the gNB determines that the beams used for one or more of the UE-specific channels and the TCI channel do not need to be updated (e.g., when channel conditions have not changed to cause the current TCI states to no longer be suitable for their corresponding channels), the process moves to step 1150. If the gNB determines that the beams used for one or more of the UE-specific channels and the TCI channel do need to be updated (e.g., when channel conditions have changed to cause the current TCI states to no longer be suitable for their corresponding channels), the process continues to step 1145.

At step 1145, the gNB determines, from the subset of candidate beams configured at step 1120, one or more of beams for the data channels and control channels (i.e., UE-specific DL and UL channels) or a beam for the channel for conveying beam indications (i.e., TCI channel) as new beams for subsequent communications on the corresponding channels, and transmits the beam indications to the UE (step 1145). For example, as disclosed herein above, the gNB can determine one or both of a new TCI state $ND_k$ or set of new TCI states $\{ND_k\}$ for DL channel beams, new TCI state $NU_m$ or set of new TCI states $\{NU_m\}$ for UL channel beams, or new set of TCI states $\{W_n\}$ for the TCI channel beams. The TCIs can also include a joint TCI that indicates both the new TCI states $ND_k$ and $NU_m$, or new TCI state sets $\{ND_k\}$ and $\{NU_m\}$. The gNB can select these TCI states from the subset of candidate beams configured at step 1120 to use as new TCI states for each beam. The gNB can then generate TCIs indicating these TCI states. The gNB can then transmit, to the UE, a TCI channel using all of the currently configured set of TCI channel beams.

The gNB then uses the set of beams for transmission and reception of data and control channels (e.g., the UE-specific UL and DL channel beams) configured at step 1120 to receive or transmit other data and control channels (e.g., data and control channels not for beam indication) (step 1150). In some embodiments, as discussed above, the gNB can perform multiple hypothesis decoding to receive all of the set $\{NU_m\}$ of UL channel beams simultaneously for the UL channel. In some embodiments, when the UE has determined a preferred beam or beams for UL channel transmission as discussed above, the gNB can receive the preferred beam or beams as an indication of a new UE-specific UL channel beam to be used by the UE. The process then returns to step 1125.

In some embodiments, the channel for conveying the beam indication (i.e., the TCI channels) also includes beam indications (i.e., TCIs) for other UEs, and can be transmitted to all UEs that share the TCI channel. This can occur when the UE is part of a UE group or subgroup with the other UEs. In these embodiments, the beam indication signaling can be shared between all UEs, shared with only some of the other UEs, or can be unique for each UE in the group.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information for a set of transmission configuration indicator (TCI) states,
receive multiple TCI state indications for a subset of TCI states from the set of TCI states, and
receive a channel conveying a subsequent TCI state indication using the subset of TCI states; and
a processor operably connected to the transceiver, the processor configured to:
decode the channel received using the subset of TCI states to determine a subsequent TCI state indicated by the subsequent TCI state indication, and
use the determined subsequent TCI state for subsequent communications.

2. The UE of claim 1, wherein:
the transceiver is further configured to:
receive a TCI state indication for a current TCI state from the set of TCI states to be used for uplink (UL) communications,
the processor is further configured to:
measure a beam metric for each TCI state within the set of TCI states;
determine that the current TCI state is not suitable for the UL communications, based on the measured beam metrics; and
determine another TCI state from the set of TCI states for the UL communications, based on the measured beam metrics, and
the transceiver is further configured to transmit information on a UL channel using the other TCI state.

3. The UE of claim 2, wherein:
the UL channel includes an indication of one or more preferred TCI states from the set of TCI states, the one or more preferred TCI states to be used for subsequent UL communications,
the UL channel is a physical uplink shared channel (PUSCH), a physical uplink control channel (PUCCH), or a feedback acknowledgement for another received transmission, and
the set of TCI states is based on a current multi-path environment between the UE and another device or a predicted multi-path environment between the UE and the other device.

4. The UE of claim 3, wherein:
the indication of the one or more preferred TCI states is a set of TCI state identifiers for the one or more preferred TCI states, or is an implicit indication based on channel resources of the UL channel or based on the other TCI state used to transmit the UL channel, or
the UL channel is a first UL channel, and the transceiver is further configured to transmit a second UL channel that indicates the other TCI state before transmission of the first UL channel on the other TCI state.

5. The UE of claim 3, wherein:
the processor is further configured to determine more than one other TCI state from the set of TCI states and the transceiver is further configured to transmit the UL channel to the other device using the more than one other TCI state, or the set of TCI states is a first set of TCI states, and the processor is further configured to determine the other TCI state from a second set of TCI states for TCI state indication to the other device.

6. The UE of claim 1, wherein:
the subset of TCI states used to receive the channel conveying the subsequent TCI state indication is a first subset of TCI states, and
the transceiver is further configured to:
  receive the channel conveying the subsequent TCI state indication on all of the first subset of TCI states;
  receive multiple TCI state indications for a second subset of TCI states from the set of TCI states;
  determine the subsequent TCI state indicated by the subsequent TCI state indication from the second subset of TCI states; and
  use the determined subsequent TCI state for subsequent communications of data or control channels.

7. The UE of claim 1, wherein:
the channel for conveying the subsequent TCI state indication also includes TCI state indications for other UEs, wherein:
  TCI state indication signaling is shared between all UEs,
  TCI state indication signaling is shared with some of the other UEs, or
  TCI state indication signaling is unique for each UE.

8. A base station (BS), comprising:
a transceiver configured to:
  transmit configuration information for a set of transmission configuration indicator (TCI) states;
  transmit multiple TCI state indications for a subset of TCI states from the set of TCI states;
  transmit a channel conveying a subsequent TCI state indication using the subset of TCI states, wherein the channel is decoded from the subset of TCI states to determine a subsequent TCI state indicated by the subsequent TCI state indication; and
  perform subsequent communications on the subsequent TCI state.

9. The BS of claim 8, wherein comprising:
transceiver is further configured to:
  transmit a TCI state indication for a current TCI state from the set of TCI states to be used for uplink (UL) communications, and
  receive information on a UL channel using another TCI state from the set of TCI states,
wherein the current TCI state is determined, based on beam metrics measured for each TCI state within the set of TCI states, not to be suitable for the UL communications, and
wherein the other TCI state is determined based on the beam metrics.

10. The BS of claim 9, wherein:
the UL channel includes an indication of one or more preferred TCI states from the set of TCI states, the one or more preferred TCI states to be used for subsequent UL communications,
the UL channel is a physical uplink shared channel (PUSCH), a physical uplink control channel (PUCCH), or a feedback acknowledgement for another received transmission, and
the set of TCI states is based on a current multi-path environment between the BS and another device or a predicted multi-path environment between the BS and the other device.

11. The BS of claim 10, wherein:
the indication of the one or more preferred TCI states is a set of TCI state identifiers for the one or more preferred TCI states, or is an implicit indication based on channel resources of the UL channel or based on the other TCI state used to transmit the UL channel, or
the UL channel is a first UL channel, and the transceiver is further configured to receive a second UL channel that indicates the other TCI state before reception of the first UL channel on the other TCI state.

12. The BS of claim 10, wherein:
the transceiver is further configured to receive the UL channel from the other device using more than one other TCI state from the set of TCI states, or
the set of TCI states is a first set of TCI states, and the other TCI state is determined from a second set of TCI states for TCI state indication from the other device.

13. The BS of claim 8, wherein:
the subset of TCI states used to transmit the channel conveying the subsequent TCI state indication is a first subset of TCI states, and
the transceiver is further configured to:
  transmit the channel conveying the subsequent TCI state indication on all of the first subset of TCI states;
  transmit multiple TCI state indications for a second subset of TCI states from the set of TCI states, wherein the subsequent TCI state indicated by the subsequent TCI state indication is determined from the second subset of TCI states; and
  perform subsequent communications of data or control channels on the subsequent TCI state.

14. The BS of claim 8, wherein:
the channel for conveying the subsequent TCI state indication also includes TCI state indications for other UEs, wherein:
  TCI state indication signaling is shared between all UEs,
  TCI state indication signaling is shared with some of the other UEs, or
  TCI state indication signaling is unique for each UE.

15. A method of a user equipment (UE) comprising:
receiving configuration information for a set of transmission configuration indicator (TCI) states;
receiving multiple TCI state indications for a subset of TCI states from the set of TCI states;
receiving a channel conveying a subsequent TCI state indication using the subset of TCI states;
decoding the channel received using the subset of TCI states to determine a subsequent TCI state indicated by the subsequent TCI state indication; and
using the determined subsequent TCI state for subsequent communications.

16. The method of claim 15, further comprising:
receiving a TCI state indication for a current TCI state from the set of TCI states to be used for uplink (UL) communications;
measuring a beam metric for each TCI state within the set of TCI states;
determining that the current TCI state is not suitable for the UL communications, based on the measured beam metrics;
determining another TCI state from the set of TCI states for the UL communications, based on the measured beam metrics; and
transmitting information on a UL channel using the other TCI state.

17. The method of claim 16, wherein:

the UL channel includes an indication of one or more preferred TCI states from the set of TCI states, the one or more preferred TCI states to be used for subsequent UL communications, the UL channel is a physical uplink shared channel (PUSCH), a physical uplink control channel (PUCCH), or a feedback acknowledgement for another received transmission, and the set of TCI states is based on a current multi-path environment between the UE and another device or a predicted multi-path environment between the UE and the other device.

18. The method of claim 17, wherein:

the indication of the one or more preferred beams is a set of TCI state identifiers for the one or more preferred beams, or is an implicit indication based on channel resources of the UL channel or based on the other TCI state used to transmit the UL channel, or the UL channel is a first UL channel, and the method further comprises transmitting a second UL channel that indicates the other TCI state before transmitting the first UL channel on the other TCI state.

19. The method of claim 17, wherein:

the method further comprises determining more than one other TCI state from the set of TCI states and transmitting the UL channel to the other device using the more than one other TCI state, or the set of TCI states is a first set of TCI states, and the method further comprises determining the other TCI state from a second set of TCI states for TCI state indication to the other device.

20. The method of claim 15, wherein:

the subset of TCI states used to receive the channel conveying the subsequent TCI state indication is a first subset of TCI states, and the method further comprises:

receiving the channel conveying the subsequent TCI state indication on all of the first subset of TCI states;

receiving multiple TCI state indications for a second subset of TCI states from the set of TCI states;

determining the subsequent TCI state indicated by the subsequent TCI state indication from the second subset of TCI states; and using the determined subsequent TCI state for subsequent communications of data or control channels.

* * * * *